(12) United States Patent
Fukumoto et al.

(10) Patent No.: US 6,980,445 B2
(45) Date of Patent: Dec. 27, 2005

(54) POWER FACTOR IMPROVING CONVERTER AND CONTROL METHOD THEREOF

(75) Inventors: Yukinari Fukumoto, Saitama (JP); Hiroshi Usui, Saitama (JP); Koichi Morita, Saitama (JP)

(73) Assignee: Sanken Electric Co., Ltd., Saitama (JP)

( * ) Notice: Subject to any disclaimer, the term of this patent is extended or adjusted under 35 U.S.C. 154(b) by 0 days.

(21) Appl. No.: 10/501,189

(22) PCT Filed: Jan. 8, 2003

(86) PCT No.: PCT/JP03/00078

§ 371 (c)(1),
(2), (4) Date: Jul. 8, 2004

(87) PCT Pub. No.: WO03/058799

PCT Pub. Date: Jul. 17, 2003

(65) Prior Publication Data

US 2005/0162143 A1    Jul. 28, 2005

(30) Foreign Application Priority Data

Jan. 8, 2002 (JP) .............................. 2002-001403
Jan. 24, 2002 (JP) .............................. 2002-016137
Apr. 8, 2002 (JP) .............................. 2002-105221

(51) Int. Cl.[7] .............................. H02M 1/12; G05F 1/40
(52) U.S. Cl. .............................. 363/45; 363/41; 363/46; 323/246; 323/284
(58) Field of Search .............................. 363/40, 41, 45, 363/46, 47, 49, 50; 323/225, 246, 283, 284, 323/285, 286

(56) References Cited

U.S. PATENT DOCUMENTS

| 5,115,185 | A | * | 5/1992 | Fraidlin et al. ................ 363/45 |
| 5,459,392 | A | * | 10/1995 | Mandelcorn .................. 363/45 |
| 5,561,596 | A | * | 10/1996 | Hemena et al. ................ 363/50 |
| 5,757,635 | A | | 5/1998 | Seong | |
| 2002/0011825 | A1 | | 1/2002 | Usui | |

FOREIGN PATENT DOCUMENTS

| JP | 03-022865 | 1/1991 |
| JP | 06-153495 | 5/1994 |
| JP | 09-238470 | 9/1997 |

* cited by examiner

*Primary Examiner*—Jessica Han
(74) *Attorney, Agent, or Firm*—Townsend and Townsend and Crew

(57) ABSTRACT

A boost quantity detecting section (103) detects a boost quantity of an inductor (L11). An operational amplifier (113) of a control section (106) compares the boost quantity detected by the boost quantity detecting section (103) with a reference voltage (ES12). When a supply voltage supplied from an AC power source (100) reduces and an output voltage is unchanged, the boost quantity detected by the boost quantity detecting section (103) increases. When a signal level of a boost quantity detection signal is higher than the reference voltage (ES12), a control section (106) reduces a target level of a switching current. The target level of the switching current decreases, so that the output voltage decreases and energy loss due to boosting reduces.

30 Claims, 28 Drawing Sheets

T1 : TIMER SETTING TIME

POWER FACTOR IMPROVING CONVERTER AND CONTROL METHOD THEREOF

TECHNICAL FIELD

The present invention relates to a power factor improving converter and its method.

BACKGROUND ART

A power factor is expressed by power/(current×voltage) and called a phase difference between current and voltage of an alternating current (AC) circuit.

In a capacitor input-type converter, a phase difference occurs when a waveform is distorted and a harmonic content is included in an input current. For this reason, there is used a power factor improving converter that controls a switching current to follow a waveform of a ripple voltage to improve a power factor without using a smoothing capacitor on a primary side where the ripple voltage is supplied.

As the power factor improving converter, there is a current control type that controls the switching current in a critical mode.

The power factor improving converter of the current control type includes a boost chopper circuit wherein a converter is configured using, for example, an inductor, a switching element, a diode and an output capacitor.

The power factor improving converter turns on the switching element to cause current to flow into the inductor and stores energy to the inductor. When the switching current reaches a target level that is set based on a supplied ripple voltage and an output voltage, the power factor improving converter turns off the switching.

When the switching element turns off, the current is supplied from the inductor to the output capacitor through the diode to release the energy stored in the inductor. The power factor improving converter detects that the current flowing into the inductor reaches a critical point (a current value reaches zero) and turns on the switching element again.

The power factor improving converter repeats such operations to maintain the voltage of the output capacitor provided at the output side constant. At the same time, a current waveform due to the supplied ripple voltage follows the waveform of the ripple voltage to form a sine wave, thereby improving the power factor.

However, since the above conventional power factor improving converter performs control in such a way that the output voltage becomes constant, when an alternating current supplied from an AC power source reduces to AC 100V from AC 200V on an effective value, a boost ratio (ratio between the output voltage and the ripple voltage) increases, so that boost energy becomes high. Particularly, when the output current on a secondary side is high, switching loss due to boosting is increased to reduce efficiency.

DISCLOSURE OF INVENTION

An object of the present invention is to provide a power factor improving converter and its control method that enables to improve efficiency.

In order to attain the above object, a power factor improving converter according to a first aspect of the present invention comprises an inductor (L11, L21, L31) to which a ripple voltage is applied; a switching element (Q11, Q21, Q31) connected to one end of the inductor (L11, L21, L31) to switch current flowing into the inductor (L11, L21, L31) according to the ripple voltage; a DC voltage generating section (D16, C11, D21, C21, D31, C31) that rectifies voltage generated across the inductor (L11, L21, L31) by switching the switching element (Q11, Q21, Q31) and smoothes to generate a DC voltage; and a control section (106, 205, 305) that sets a target level of a switching current flowing into a current path of the switching element based on a voltage level of the ripple voltage and controls to turn on and off the switching element (Q11, Q21, Q31) in such a way that the switching current reaches the target level, wherein the control section (106, 205, 305) obtains a parameter, which changes when a ratio between an effective value of the ripple voltage and a voltage value of the DC voltage generated by the DC voltage generating section (D16, C11, D21, C21, D31, C31) changes, and controls the target level of the switching current according to a value of the obtained parameter.

This may further comprise a boost quantity detecting section (103) having a secondary winding (n10) electromagnetically coupled to the inductor (L11) to detect a boost quantity of the inductor (L11) generated across the secondary winding (n10), wherein the control section (106, 205, 305) may obtain the boost quantity detected as the parameter by the boost quantity detecting section (103).

The boost quantity detecting section (103) may detect the boost quantity from any one of an effective value of a ripple voltage, an average value and a peak value.

The control section (205) may include a duty ratio detecting section (221) that detects a duty ratio of a control signal that controls to turn on and off the switching element (Q21) to obtain the duty ratio detected by the duty ratio detecting section (221).

The duty ratio detecting section (221) may detect on-duty or off-duty of the control signal.

The duty ratio detecting section (221) may detect the duty ratio of the control signal for a fixed cycle and the control section (106) may controls the target level of the switching current based on the duty ratio of the control signal detected by the duty ratio detecting section (221).

The duty ratio detecting section (221) may detect the duty ratio of the control signal for substantially the same fixed cycle as the cycle of the ripple voltage.

The control section (205) may include a power measuring section (237) that measures power to be supplied to a load and obtain power as another parameter measured by the power measuring section (237), and control the target level of the switching current according to the duty ration of the control signal and power.

The control section (305) may include a supply current detecting section (321) that detects a current level of a supply current to be supplied to the inductor (L31) for one cycle of the ripple voltage, and obtain the current level of the supply current detected as the parameter by the supply current detecting section (321).

The supply current detecting section (321) may detect a current level of a switching current flowing into a current path of the switching element (Q31) as a current level of supply current to be supplied to the inductor (L31) for one cycle of the ripple voltage.

The supply current detecting section (321) may detect a current level of current flowing into the DC voltage generating section (D31, C31) as a current level of supply current to be supplied to the inductor (L31) for one cycle of the ripple voltage.

The supply current detecting section (321) may include an integrator.

The supply current detecting section (321) may include any one of an effective value detecting circuit that obtains an effective value of supply current as the current level of the supply current for one cycle of the ripple voltage, an average value detecting circuit that obtains an average value and a peak value detecting circuit that obtains a peak value.

The control section (305) may include a power detecting section (237) that detects a power level of DC voltage generated by the DC voltage generating section (D16, C11, D21, C21, D31, C31) and obtain a voltage level as another parameter obtained by dividing by the current of the supply current, and controls the target level of the switching current according to the current level of the supply current and the voltage level.

This may further comprise a boost chopper circuit wherein one end of the DC voltage generating section (D16, C11, D21, C21, D31, C31) is connected to a junction between the inductor (L11, L21, L31) and the switching element (Q11, Q21, Q31), the other end of the current path of the switching element (Q11, Q21, Q31) and the other end of the DC voltage generating section (D16, C11, D21, D31, C31) are connected to a negative polarity; and a rectifying voltage is applied to the other end of the inductor (L11, L21, L31).

The inductor (L21) may include a secondary winding (n22) that is electromagnetically coupled to the inductor (L21) as a primary winding (n21) and a transformer (T) having the DC voltage generating section (D21, C21) is connected across the secondary winding (n22) wherein a rectifying voltage is applied to the other end of the inductor (L21).

The DC voltage generating section (D16, C11, D21, C21, D31, C31) may include an overvoltage protecting section (105) that supplies such an overvoltage protection signal that reduces the target voltage of the switching current to the control section (106, 205, 305) when the voltage level of the generated DC voltage exceeds a setting level.

The control section (106, 205, 305) may include an amplifier (113, 223, 323) that compares a signal level of an output voltage signal corresponding to an output voltage with a signal level of a predetermined reference signal to output a difference signal between both signal levels as a signal that controls the target level of the switching current; and a reference signal generating circuit (121, 222, 322) that compares a value of the parameter with a setting value, and supplies such a reference signal, which reduces the target level of the switching current of the switching element (Q11, Q21, Q31) as a ratio between the effective value of the ripple voltage and the voltage value of the DC voltage generated by the DC voltage generating section (D16, C11, D21, C21, D31, C31) increases based on a comparison result, to the amplifier (113, 223, 323).

The reference signal generating circuit (121, 222, 322) may have a hysterisis characteristic.

The control section (106, 205, 305) may include an amplifier (113, 223, 323) that compares a signal level of an output voltage signal corresponding to an output voltage with a signal level of a predetermined reference signal to output a difference signal between both signal levels as a signal that controls the target level of the switching current; and a reference signal generating circuit (121, 222, 322) that has a plurality of setting values to be compared with a value of the parameter, and supplies such a reference signal, which reduces the target level of the switching current of the switching element (Q11, Q21, Q31) sequentially every time when the value of the parameter increases and exceeds each of the respective setting values, to the amplifier (113, 223, 323).

The reference signal generating circuit (121, 222, 322) may have a hysterisis characteristic.

When the reference signal is supplied from the reference signal generating circuit (121, 222, 322), the amplifier (113, 223, 323) may output such a difference signal in which the signal level of the difference signal becomes small according to a predetermined function indicating a relationship between the value of the parameter and a change in the signal level of the difference signal.

The predetermined function may be a function in which a relationship between time when the value of the obtained parameter exceeds the setting value and the signal level of the difference signal is expressed by a linear function.

The reference signal generating circuit (121, 222, 322) may restrict the signal level of the reference signal in such a way to set an upper limit value or a lower limit value corresponding to a DC voltage generated by the DC voltage generating section (D16, C11, D21, C21, D31, C31).

The control section (106, 205, 305) may include an amplifier (323) that compares a signal level of an output voltage signal corresponding to an output voltage with a signal level of a predetermined reference signal to output a difference signal between both signal levels as a signal that controls the target level of the switching current; and an output voltage signal control circuit (331) that reduces a signal level of an output voltage signal to be supplied to the amplifier (323) in such a way to reduce the target level of the switching current of the switching element (Q11, Q21, Q31) when the value of the obtained parameter is compared with the setting value and the value of the obtained parameter exceeds the setting value.

The control section (106, 205, 305) may include a timer (236) that delays the output of the reference signal to the amplifier from the reference signal generating circuit (121, 222, 322) by a predetermined time when the value of the obtained parameter exceeds the setting value.

A power factor improving converter control method according to a second aspect of the present invention is a power factor improving converter control method that controls a power factor improving converter including an inductor (L11, L21, L31) to which a ripple voltage is applied; a switching element (Q11, Q21, Q31) connected to one end of the inductor (L11, L21, L31) to switch current flowing into the inductor (L11, L21, L31) according to the ripple voltage; and a DC voltage generating section (D16, C11, D21, C21, D31, C31) that rectifies voltage generated across the inductor (L11, L21, L31) by switching the switching element (Q11, Q21, Q31) and smoothes to generate a DC voltage; the method comprising the steps of setting a target level of a switching current flowing into a current path of the switching element based on a voltage level of the ripple voltage; controlling to turn on and off the switching element (Q11, Q21, Q31) in such a way that the switching current reaches the target level; obtaining a parameter that changes when a ratio between an effective value of the ripple voltage and a voltage value of the DC voltage generated by the DC voltage generating section (D16, C11, D21, C21, D31, C31) changes; and controlling the target level of the set switching current according to a value of the obtained parameter.

This may further comprise the steps of detecting a boost quantity of the inductor (L11, L21, L31); and obtaining the detected boost quantity as a parameter.

This may further comprise the steps of detecting a duty ratio of a control signal that controls to turn on and off the switching element (Q11, Q21, Q31); and obtaining the detected duty ratio as a parameter.

This may further comprise the steps of detecting a current level of current flowing into the inductor (L11, L21, L31) according to the ripple voltage; and obtaining the current level of the detected supply current as the parameter.

BEST MODE FOR CARRYING OUT THE INVENTION

The following will explain the power factor improving converter according to embodiments of the present invention with reference to the drawings.

[First Embodiment]

A power factor improving converter according to a first embodiment is one that obtains a boost quantity of an inductor as a parameter and controls a target level of a switching current according to the obtained boost quantity.

Figure 1:
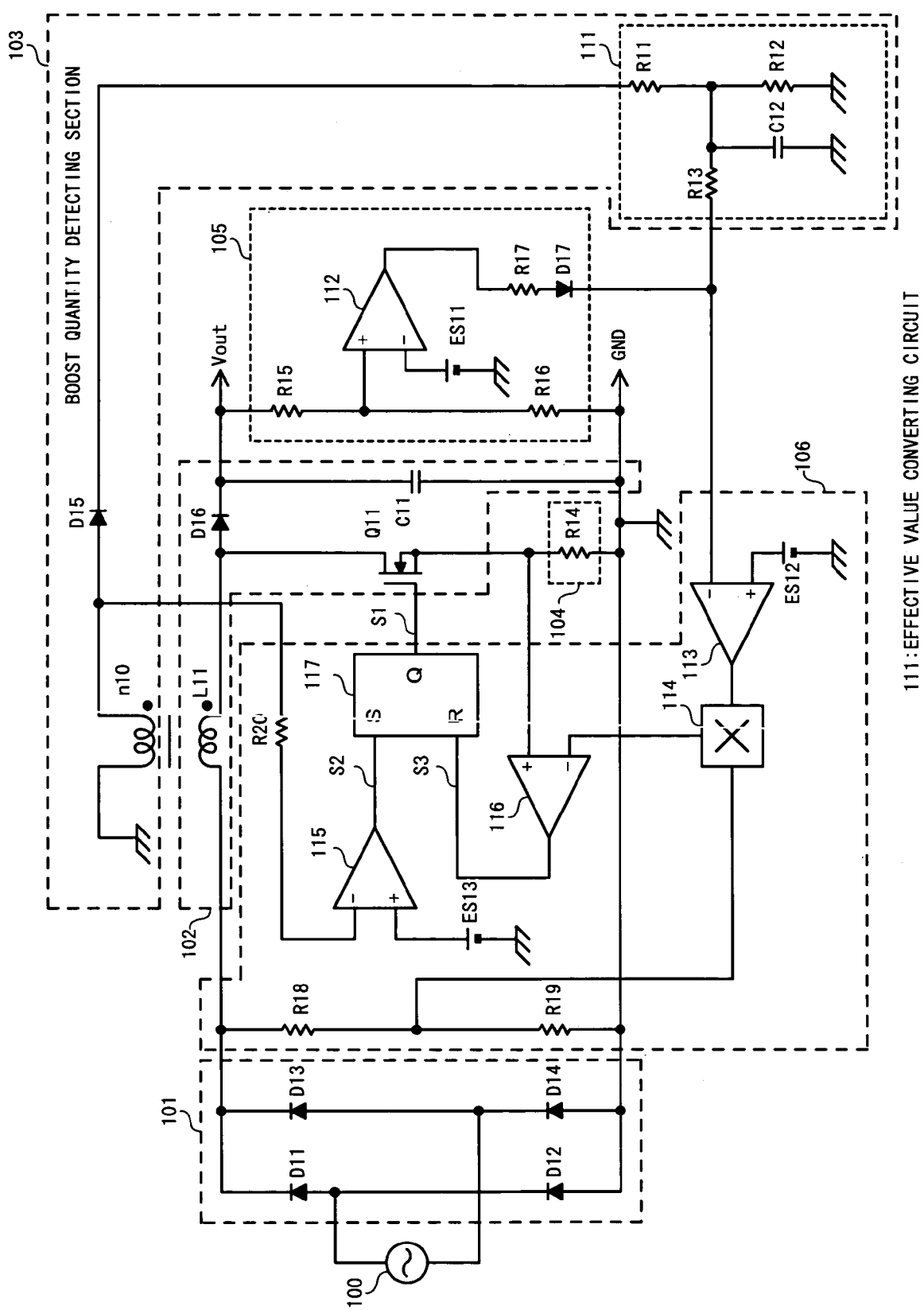
FIG. 1 is a circuit diagram illustrating a configuration of a power factor improving converter according to a first embodiment of the present invention.

FIG. 1 illustrates a configuration of the power factor improving converter according to the first embodiment of the present invention.

The power factor improving converter according to the first embodiment of the present invention includes a rectifying section 101, a voltage converting section 102, a boost quantity detecting section 103, a switching current detecting section 104, an overvoltage protecting section 105, and a control section 106.

The rectifying section 101 is one that full-wave rectifies AC power supplied from an AC power source 100 to generate a ripple voltage and includes a bridge rectifying circuit having diodes D11 to D14.

A cathode of the diode D11 and a cathode of the diode D13 are connected to each other. A cathode of the diode D12 is connected to an anode of the diode D11. A cathode of the diode D14 is connected to an anode of the diode D13. An anode of the diode D12 and an anode of the diode D14 are connected to each other. The AC power source 100 is connected between a junction between the diodes D11 and D12 and a junction between the diodes D13 and D14.

The voltage converting section 102 is one that converts the ripple voltage generated by the rectifying section 101 to a DC output voltage and includes a boost chopper circuit. Namely, the voltage converting section 102 includes an inductor L11, a transistor Q11, a diode D16, and a capacitor C11.

The inductor L11 is one that stores energy by current flowing according to the ripple voltage supplied from the rectifying section 101 to generate electromotive force, and its one end is connected to the cathodes of the diodes D11 and D13 of the rectifying section 101.

The transistor Q11 is one that turns on/off to change current flowing into the inductor L11 and cause the inductor L11 to excite the electromotive force, and is formed of an n-channel field effect transistor (FET). The transistor Q11 turns on when a high-level signal is supplied to a gate. Moreover, the transistor Q11 turns off when a low-level signal is supplied to the gate. A drain of the transistor Q11 is connected to the other end (output terminal) of the inductor L11 and a source is connected to the anodes of the diodes D12 and D14 of the rectifying section 101 through a resistor R14.

A diode D16 is a diode that prevents current from flowing backward from the capacitor C11 to rectify the current when the transistor Q11 turns on. An anode of the diode D16 is connected to the other end of the inductor L11.

The capacitor C11 is one that smoothes current supplied from the inductor L11 through the diode D16. One end (positive polarity) of the capacitor C11 is connected to a cathode of the diode D16. The other end (negative polarity) of the capacitor C11 is connected to the anodes of the diodes D12 and D14 of the rectifying section 101.

In addition, the other end (negative polarity) of the capacitor C11 is grounded.

The switching current detecting section 104 is one that detects a switching (drain) current flowing into the transistor Q11 and converts the switching (drain) current to a voltage signal to output. The switching current detecting section 104 includes a resistor R14. The resistor R14 is one that converts the switching (drain) current to the voltage signal and is connected between the source of the transistor Q11 and the ground.

The boost quantity detecting section 103 is one that detects a boost quantity due to the inductor L11. The boost quantity changes when a ratio between an effective value of the ripple voltage and the voltage value of the output voltage changes. Namely, the boost quantity is used as a parameter indicating the ratio between the effective value of the ripple voltage and the voltage value of the output value.

The boost quantity detecting section 103 includes a winding n10, a diode D15 and an effective value converting circuit 111.

The winding n10 is one that detects a critical current of the inductor L11 and detects voltage generated at the inductor L11. One end of the winding n10 is grounded.

The diode D15 is one that rectifies current flowing according to the voltage generated at the winding n10. An anode of the diode D15 is connected to the other end of the winding n10.

The effective value converting circuit 111 is one that obtains an effective value of the boost voltage generated at the winding n10. The effective value converting circuit 111 includes resistors R11 to R13 and the capacitor C12.

One end of the resistor R11 is connected to the cathode of the diode D15. One end of the resistor R12 is connected to the other end of the resistor R11. The other end of the resistor R12 is grounded. One end of the capacitor C12 is connected a junction between the resistors R11 and R12. The other end of the capacitor C12 is grounded. Moreover, one end of the resistor R13 is connected to one end of the capacitor C12 and the other end is connected to a −terminal of an operational amplifier 113 of the control section 106.

In addition, a resistance value of the resistor R12 is extremely increased as compared with a resistance value of the resistor R11 and a capacity of the capacitor C12 is reduced, so that the effective value converting circuit 111 detects a peak value of the boost voltage. In this way, the constants of the resistors R11 and R12 and the capacitor C12 are adjusted, so that the effective value converting section 111 not only detects the effective value of the boost voltage but also functions as a detection circuit of a peak value or an average value.

The overvoltage protecting section 105 is one that protects a load connected to the output terminal from overvoltage and includes resistors R15 to R17, a comparator 112, and a diode D17.

One end of the resistor R15 is connected to one end (positive polarity) of the capacitor C11. One end of the resistor R16 is connected to the other end of the resistor R15. The other end of the resistor R16 is connected to the other end (negative polarity) of the capacitor C11.

The comparator 112 is one that compares voltage divided by the resistor R15 and the resistor R16 with a reference voltage ES11 to detect the overvoltage of the output voltage.

The reference voltage ES11 is supplied to a −terminal (inverse input terminal) of the comparator 112. The reference voltage ES11 is voltage that is preset to determine overvoltage. A +terminal (non-inverse input terminal) of the comparator 112 is connected to junctions of the resistors R15 and R16. An output terminal of the comparator 112 is connected to an anode of the diode D17 through the resistor R17.

The comparator 112 outputs a high level signal when the signal level of the signal supplied to the +terminal exceeds the reference voltage.

The control section 106 is one that supplies a signal S1 as a pulse signal to the gate of the transistor Q11 to perform on/off control of the transistor Q11. The control section 106 includes an operational amplifier 113, a multiplier 114, comparators 115, 116, a flip-flop 117, and resistors R18 to R20.

The operational amplifier 113 is one that compares the boost quantity detected by the boost quantity detecting section 103 with a reference voltage ES12 and amplifies the error voltage. The reference voltage ES12 is supplied to a +terminal of the operational amplifier 113. A −terminal of the operational amplifier 113 is connected to a cathode of the diode D17 of the overvoltage protecting section 105.

The operational amplifier 113 outputs a signal indicating an error voltage between the boost quantity and the reference voltage ES12.

The register R18 and the resister R19 are division registers that detect the supply voltage rectified by the rectifying section 101. One end of the register R18 is connected to the cathodes of the diodes D11 and D13, and one end of the register R19 is connected to the other end of the register R18. The other end of the register R19 is connected to the anodes of the diodes D12 and D14.

The multiplier 114 is one that sets a target level of the switching current based on the supply voltage and the boost quantity (effective value). The multiplier 114 is connected between a junction between the registers R18 and R19 and an output terminal of the operational amplifier 113. Moreover, the multiplier 114 supplies a signal with a level, which is obtained by multiplying a signal level of a signal output from the junction between the registers R18 and R19 by a signal level of a signal output from the operational amplifier 113, to a −terminal of the comparator 116.

The comparator 115 is one that sets the flip-flop 117 with timing when a critical current of the inductor L11 is detected. A reference voltage ES13 is supplied to a +terminal of the comparator 115. The reference voltage ES13 is voltage that is preset to detect the critical current. A −terminal of the comparator 115 is connected to the other end of the winding n10 through the resistor R20. An output terminal of the comparator 115 is connected to an S (set) terminal of the flip-flop 117. When the voltage generated at the winding n10 reaches the reference voltage ES13 or less, the comparator 115 supplies a high level signal S2 to the S terminal of the flip-flop 117.

The comparator 116 is one that resets the flip-flop 117 with timing when the switching current reaches the target level.

A +terminal of the comparator 116 is connected to a junction between a source terminal of the transistor Q11 and the register R14 of the switching current detecting section 104.

The flip-flop 117 is one that generates the signal S1 based on the signal S2 of the comparator 115 and a signal S3 output from the comparator 116. The flip-flop 117 supplies the generated signal S1 as a gate signal to the gate of the transistor Q11. The set terminal S of the flip-flop 117 is connected to the output terminal of the comparator 115. A reset terminal of the flip-flop 117 is connected to an output terminal of the comparator 116. An output terminal Q of the flip-flop 117 is connected to a gate terminal of the transistor Q11.

Figure 2:
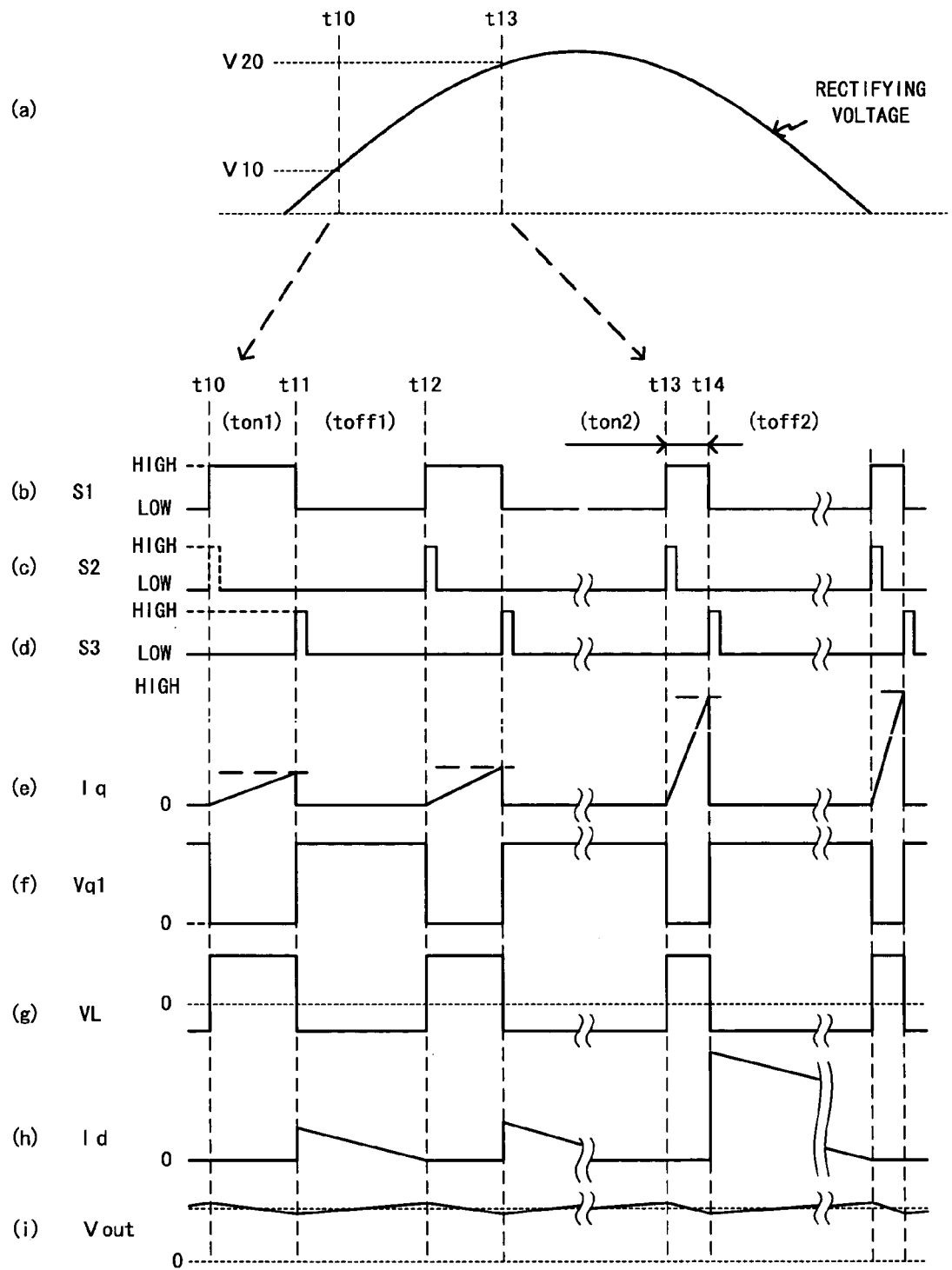
FIG. 2 is a timing chart illustrating an operation of the power factor improving converter of FIG. 1.

An explanation will be next given of the operation of the power factor improving converter according to the first embodiment with reference to FIG. 2.

Additionally, in FIG. 2, Iq and Vq1 indicate a drain current flowing into the transistor Q11 and a drain voltage applied between the drain and the source of the transistor Q11, respectively. Moreover, VL indicates voltage to be applied across the inductor L11. Vout indicates an output voltage.

The AC power source 100 supplies AC power to the rectifying section 101.

The diodes D11 to D14 of the rectifying section 101 rectifies the AC power supplied from the AC power source 100 and generates rectifying a ripple voltage with a ripple current as illustrated in FIG. 2(a). The rectifying section 101 supplies the rectifying voltage to the voltage converting section 102.

Energy of the inductor L11 is released at time t10. When the boost voltage of the winding n10 is lower than the reference voltage ES13, the output signal of the comparator 115 has a high level. When the output signal of the comparator 115 has a high level, the flip-flop 117 is set as illustrated in FIG. 2(c). When being set, the flip-flop 117 causes the signal level of the signal S1 that is supplied to the gate of the transistor Q11 to rise to a high level as illustrated in FIG. 2(b). When the high-level signal S1 is supplied to the gate of the transistor Q11, the transistor Q11 turns on.

When the transistor turns on, the voltage Vq1 becomes 0 as illustrated in FIG. 2(f). Due to this, the current Iq flows from the cathodes of the diodes D11, D13 to the anodes of the diodes D12, D14 through the inductor L11, the transistor Q11 and the resistor R14 as illustrated in FIG. 2(e). This allows energy to be stored in the inductor L11.

While the transistor Q11 is on, though the voltage of the drain terminal of the transistor Q11 becomes lower than output voltage Vout, the diode D16 prevents the current from flowing backward. For this reason, the current Id does not flow into the diode D16 as illustrated in FIG. 2(h) and voltage LV is generated across the inductor L11 as illustrated in FIG. 2(g).

While the transistor Q11 is on, the current Iq increases gradually as illustrated in FIG. 2(e).

The resistor R14 of the switching current detector 104 detects the switching (drain) current flowing into the transistor Q11 as a voltage signal and outputs the detected signal to the +terminal of the comparator 116.

A broken line illustrated in FIG. 2(e) indicates a target value of the switching current. When the current Iq reaches the target level at time t11, as illustrated in FIG. 2(d), the comparator 116 causes the signal level of the signal S3 that is output from the output terminal to rise to a high level.

When the signal level of the signal S3 becomes the high level, the flip-flop 117 is reset. When being reset, the flip-flop 117 causes the signal level of the signal S1 to fall to a low level as illustrated in FIG. 2(b).

When the signal level of the signal S1 becomes the low level, the transistor Q11 turns off. When the transistor Q11 turns off, voltage, which is obtained by adding rectifying voltage to the energy stored in the inductor L11, is applied to the capacitor C11 through the diode D16. The capacitor C11 is charged by this voltage. The capacitor C11 outputs voltage high than the peak value of the supplied voltage.

When all energy stored in the inductor L11 is released, the current Id flowing into the inductor L11 becomes substantially zero. Voltage due to ringing is generated at the winding n10 and the voltage of the winding n10 inverts.

At the time of inverting, when the voltage of the winding n10 becomes lower than the reference voltage ES13, the comparator 115 causes the signal S2 to rise to a high level as illustrated in FIG. 2(c).

When the signal S2 becomes the high level, the flip-flop 117 is set again. Then, the transistor Q11 turns on again.

In this way, the transistor Q11 turns on/off, repeatedly.

Next, at time t13, the rectifying voltage becomes V20 (V20>V10) as illustrated in FIG. 2(a).

The target levels of current Iq at time t10, t13 correspond to voltages V10, V20, respectively, and the target level of the current Iq at the time of the voltage V20 becomes higher than the level at the time of voltage V10.

However, when the rectifying voltage becomes high, the current Iq flowing into the inductor L11 rapidly increases. For this reason, a pulse width of the signal S1 reduces as illustrated in FIG. 2(b).

In this way, the peak value of the current Iq follows the voltage level (ripple current) of a rectifying voltage Vin. Then, the voltage Iq follows the ripple rectifying voltage to improve the power factor.

In addition, when a load current is made constant, an on-duty that indicates a ratio of an on-time during one cycle reduces, and even if the rectifying voltage changes, an average switching current becomes constant.

At the winding n10 of the boost quantity detecting section 103, voltage corresponding to voltage VL of the inductor L11 is generated. The diode D15 rectifies the voltage. The voltage rectified by the diode D15 shows a boost quantity of the inductor L11. The resistors R11 and R12 of the effective value converting circuit 111 divide the voltage rectified by the diode D15. The capacitor C12 smoothes the voltage divided by the registers R11 and R12. This voltage indicates an effective value of the boost quantity. The boost quantity detecting section 103 outputs a detection signal of the effective value of the boost quantity to the operational amplifier 113 of the control section 106.

The operational amplifier 113 compares the signal level of the detection signal of this boost quantity (effective value) with the reference value ES12. The operational amplifier 113 amplifies an error voltage between the boost quantity (effective value) and the reference voltage ES12 as a comparison result, and supplies the output signal to the multiplier 114.

If the load is constant and the effective value of the input voltage is substantially constant, the boost quantity becomes substantially constant. If the boost quantity is substantially constant, the effective value of the switching current becomes substantially constant and the output voltage becomes constant.

Additionally, at the starting time and the input/output suddenly changing time, delay occurs in the effective value converting circuit 111. This delay increases the output voltage, and when the signal level of the signal supplied to the +terminal of the comparator 112 exceeds the reference voltage ES11, the comparator 112 outputs a high-level signal.

When the signal level of the output signal of the comparator 112 becomes higher than the signal level of the signal output from the effective value converting circuit 111, the operational amplifier 113 reduces the output signal. For this reason, the target level of the switching current largely decreases and the switching current Iq also decreases largely, so that the output voltage Vout decreases. In this way, the load connected to the output terminal is protected from the overvoltage.

Next, when the supply voltage of the AC power 100 reduces from AC 200V to AC 100V on the effective value, the control section 106 performs control that decreases the output voltage Vout in such a way that the boost energy is reduced.

Figure 3:
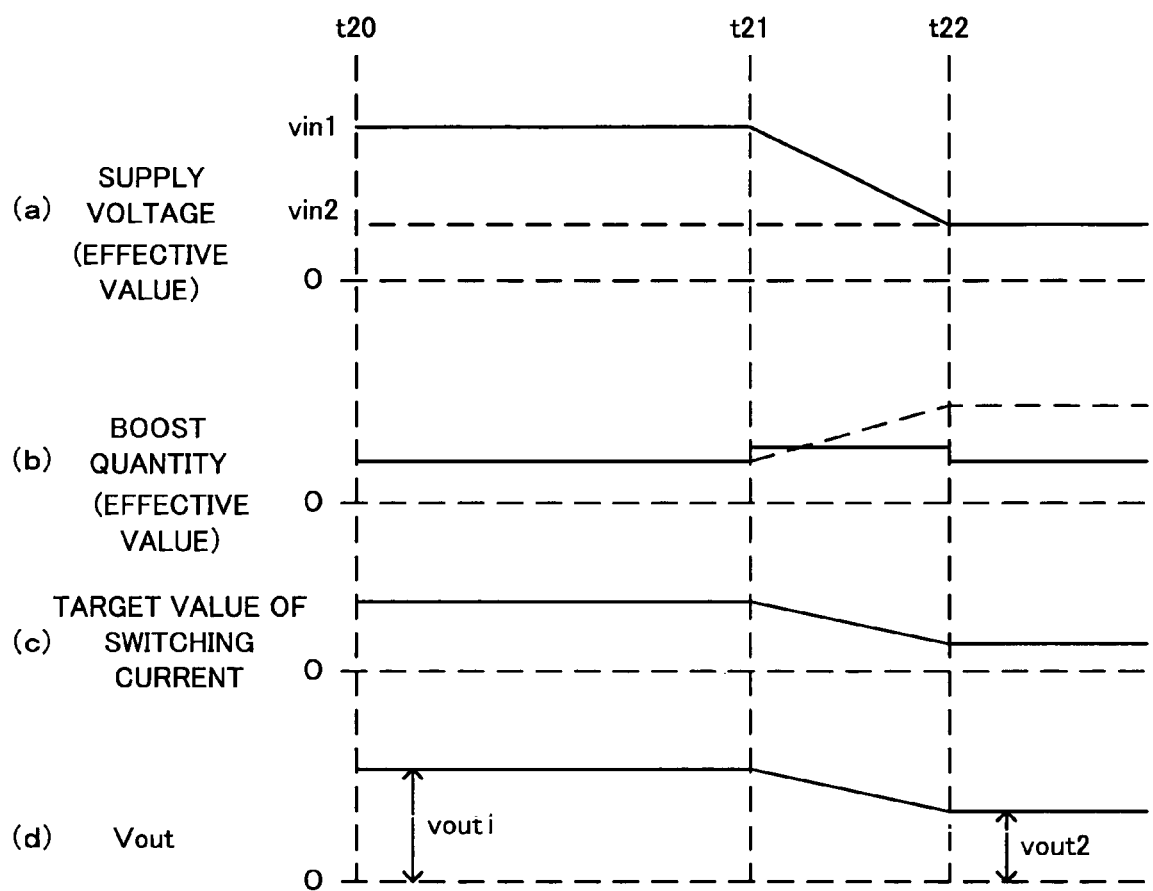
FIG. 3 is a timing chart illustrating an operation of the power factor improving converter of FIG. 1 when a supply voltage changes.

The operation will be explained based on FIG. 3.

As illustrated in FIG. 3(a), it is assumed that the effective of the supply voltage, which was vin1 at time t20 to t21, reduces at time t21 and becomes vin2 (vin1>vin2) at time t22. When the effective value of the supply voltage reduces from vin1 to vin2, the boost quantity (effective value), which is output from the effective value converting circuit 111, increases as illustrated in FIG. 3(b).

In the conventional power factor improving converter, when the supply voltage reduces, the boost quantity increases as it is as shown by a broken line of FIG. 3(b). When the boost quantity becomes large, boost loss increases and efficiency decreases.

However, in the power factor improving converter according to the present embodiment, when the boost quantity slightly increases as shown by a slot line of FIG. 3(b), the output signal of the operational amplifier 113 slightly decreases and the target level of the switching current Iq also slightly decreases as illustrated in FIG. 3(c). For this reason, timing with which the flip-flop 117 is reset accelerates slightly and the switching current Iq becomes small slightly. When the switching current Iq becomes small slightly, the output voltage Vout decreases from vout1 and reaches vout2 as illustrated in FIG. 3(d).

In addition, a boost ratio a of the voltage is expressed by the following equation (1).

$$a = vout/vin \tag{1}$$

wherein a=boost ratio, vout: voltage value of output voltage, vin: voltage value of ripple voltage Vin.

As in the conventional case, when the output voltage Vout is made constant even if the effective value Vin of the rectifying voltage becomes low, the boost ratio a increases and boost energy becomes large.

However, in the power factor improving converter according to the present embodiment, since the output voltage Vout decreases when the supply voltage of the AC power 100 decreases, the boost ratio a becomes small and boost energy decreases as shown in the equation (1). For this reason, the switching loss reduces to improve efficiency is improved.

As explained above, according to the present embodiment, when the input/output condition is changed to such a condition that needs boost energy, the boost quantity is detected, so that a change in the input condition is detected to change the output voltage. Accordingly, even if the input condition is changed and the input voltage decreases, the boost ratio is reduced, so that boost energy is also reduced. This makes it possible to reduce the switching loss to largely improve efficiency.

Moreover, at a light load time, when the switching current decreases, the output voltage rises and high voltage is stored in the output capacitor, thereby making it possible to prevent a voltage dip at a load suddenly changing time.

Furthermore, the power factor is maintained even at the light load time.

[Second Embodiment]

A power factor improving converter according to a second embodiment is one that varies the reference voltage of the output voltage based on the effective value of the boost quantity to make it possible to perform control of the output voltage.

Figure 4:
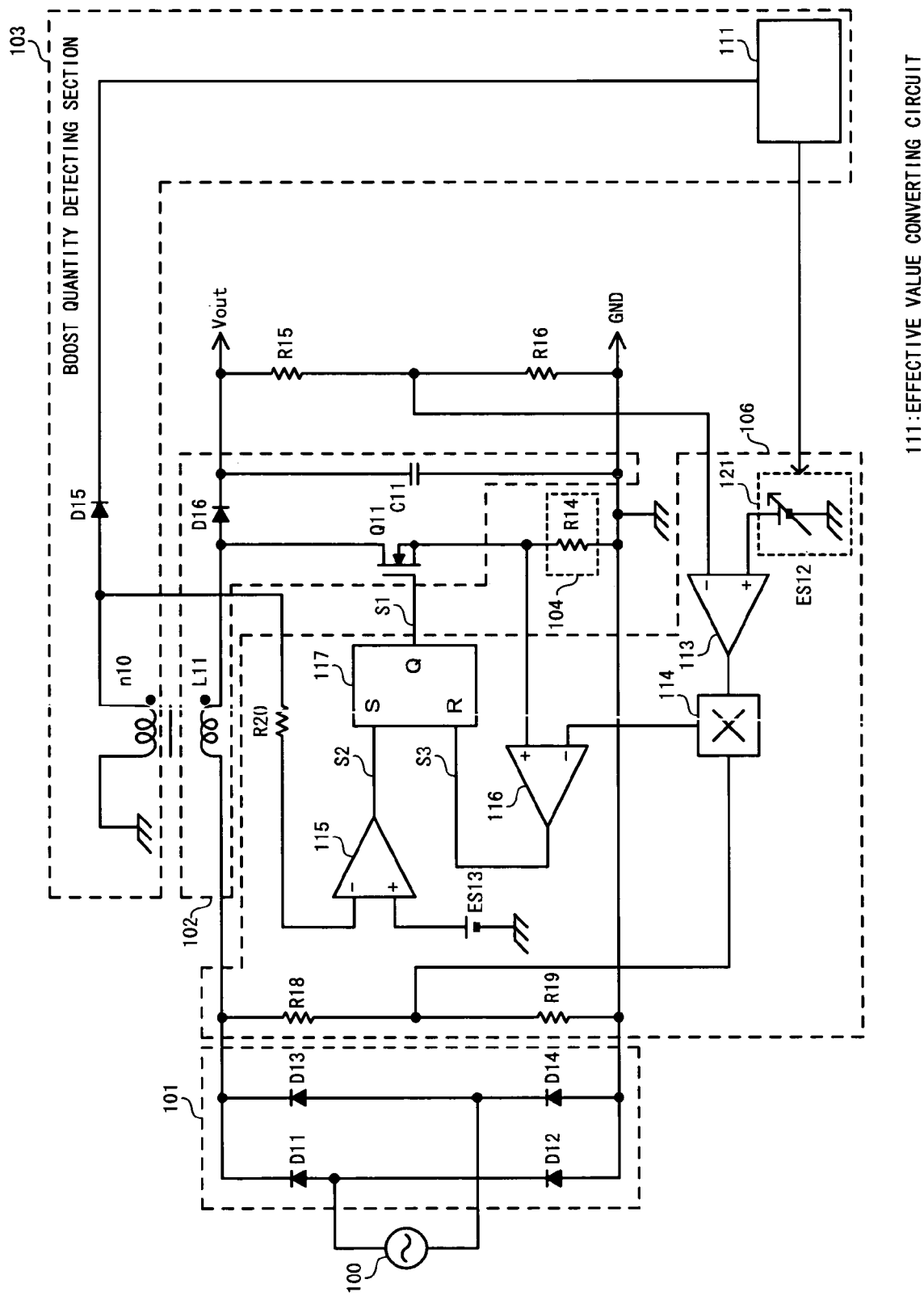
FIG. 4 is a circuit diagram illustrating a configuration of a power factor improving converter according to a second embodiment of the present invention.

A configuration of the power factor improving converter according to the second embodiment is illustrated in FIG. 4.

The power factor improving converter according to the second embodiment includes a reference voltage generating circuit 121 in the control section 106.

The reference voltage generating circuit 121 is one that varies the reference voltage based on the output voltage of the effective value converting circuit 111 of the boost quantity detecting section 103 to supply the reference voltage ES12 to the +terminal of the operational amplifier 113.

Figure 5:
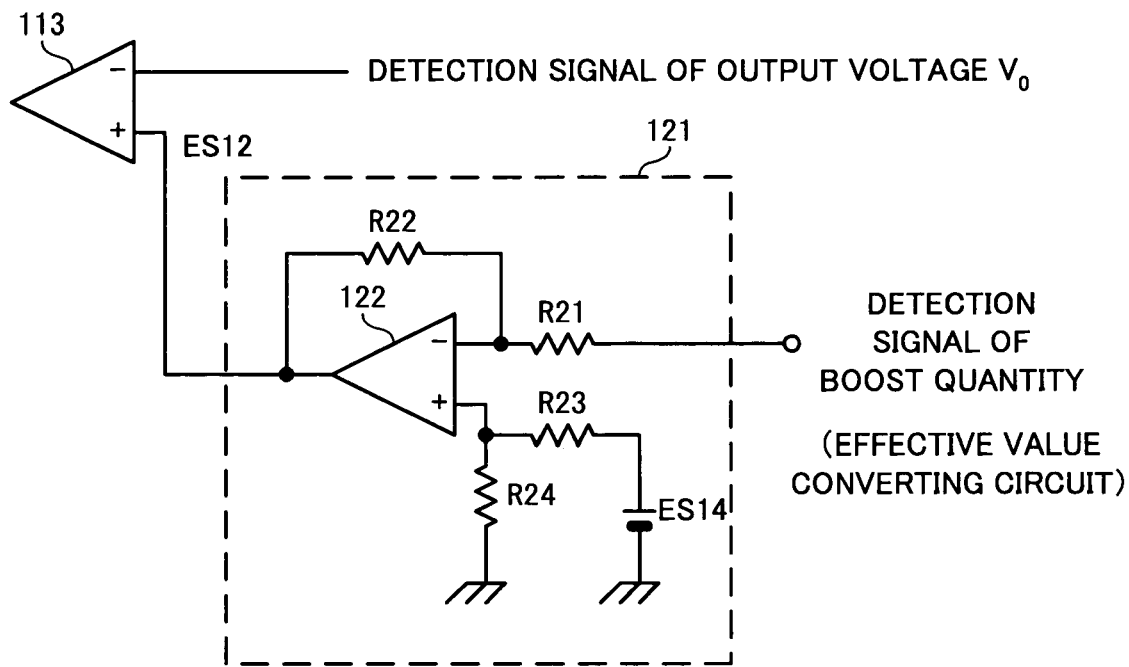
FIG. 5 is a circuit diagram illustrating a configuration of a reference voltage generating circuit that the power factor improving converter of FIG. 4 includes.
Figure 6:
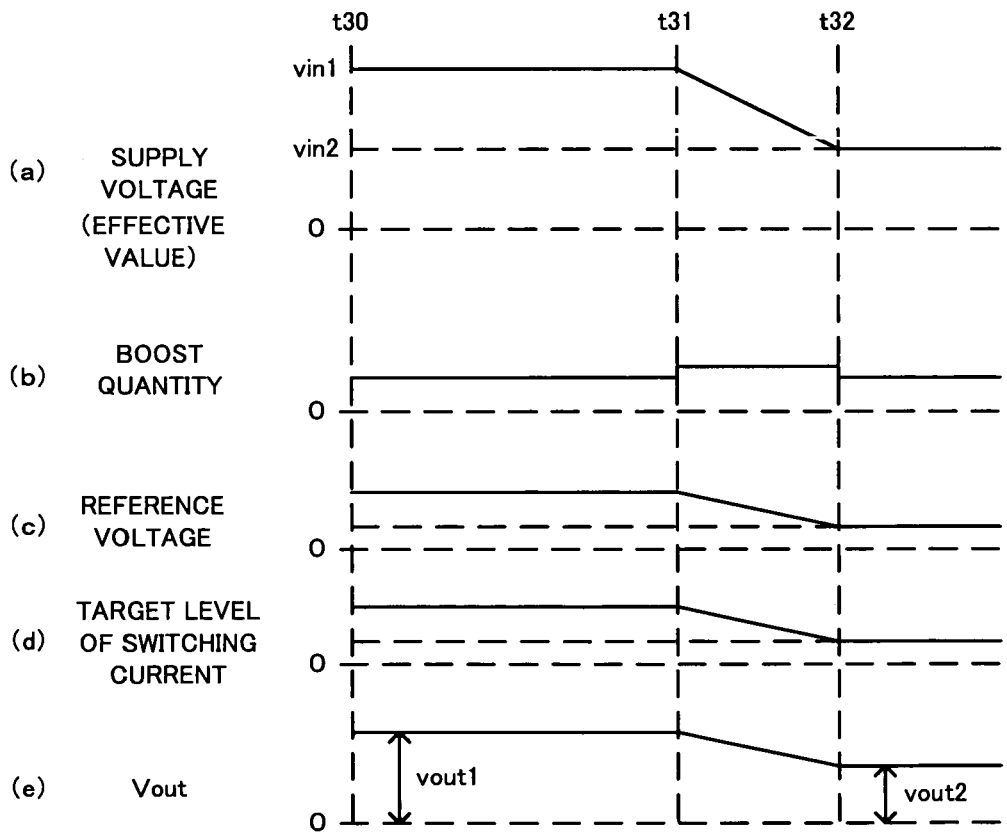
FIG. 6 is a timing chart illustrating an operation of the power factor improving converter of FIG. 4.

The circuit configuration of the reference voltage generating circuit 121 is illustrated in FIG. 5.

The reference voltage generating circuit 121 includes an operational amplifier 122 and registers R21 to R24. A reference voltage ES14 is supplied to a +terminal of the operational amplifier 122 through the resistor R23.

The reference voltage generating circuit 121 operates to reduce the reference voltage ES12 as the boost quantity rises.

Moreover, in the second embodiment, a voltage detection signal obtained by dividing the output voltage by the resistors R15 and R16 is supplied to a −terminal of the operational amplifier 113.

An explanation will be next given of the operation of the power factor improving converter according to the second embodiment.

The operational amplifier 113 compares a signal level of the voltage detection signal divided by the resistors R15 and R16 with the reference voltage ES12.

When the boost quantity is substantially constant, the reference voltage ES12 also becomes constant.

In this case, the output voltage Vout is controlled to be substantially constant. Namely, when the output voltage Vout increases and the signal level of the voltage detection signal exceeds the reference voltage ES12, the operational amplifier 113 reduces a signal level of an error signal to be output. When the signal level of the error signal reduces, the target level of the switching current reduces and the average value of the switching current reduces. For this reason, the output voltage Vout reduces. Moreover, the signal level of the voltage detection signal is the reference voltage ES12 or less, the operational amplifier 113 increases the signal level of the error signal. When the signal level of the error signal increases, the target level of the switching current increases and the average value of the switching current increases. For this reason, the output voltage Vout rises.

Furthermore, when the boost quantity increases and a boost quantity detection signal becomes higher than the signal level of the +terminal of the operational amplifier 122, the operational amplifier 122 slightly reduces the reference voltage ES12, similar to the first embodiment. When the reference voltage ES12 is slightly reduced, the operational amplifier 113 slightly reduces the signal level of the output signal. When the signal level of the output signal of the operational amplifier 113 is decreased, the target level of the switching current Iq slightly becomes small. For this reason, the switching current Iq slightly becomes small, and the output voltage Vout decreases.

As explained above, according to the present embodiment, the reference voltage ES12 is varied based on the boost quantity and comparison between the reference voltage ES12 and the voltage detection signal is performed.

Accordingly, when the boost quantity increases, the boost ratio is reduced, so that boost energy can be reduced. In addition to this, when the boost quantity is constant, such feedback control that makes the output voltage Vout substantially constant can be performed.

[Third Embodiment]

A power factor improving converter according to a third embodiment is one in which an upper limit value and a lower limit value are provided in the output voltage.

The power factor improving converter according to the third embodiment is configured, similar to the second embodiment illustrated in FIG. 4.

Figure 7:
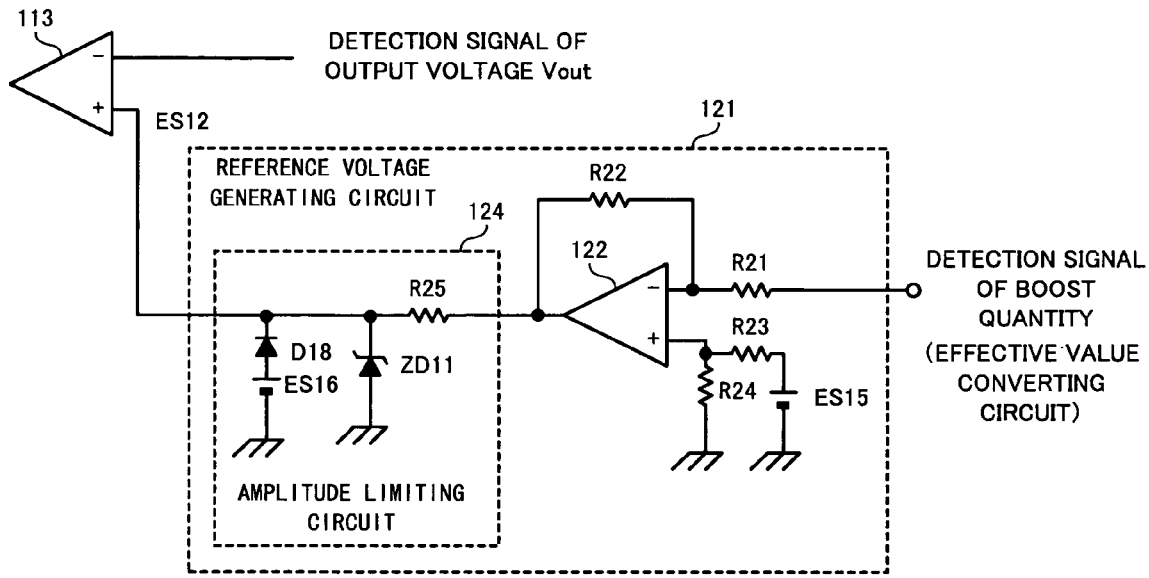
FIG. 7 is a circuit diagram illustrating a configuration of a power factor improving converter according to a third embodiment of the present invention.

The power factor improving converter according to the third embodiment includes a reference voltage generating circuit 121 configured as illustrated in FIG. 7.

The reference voltage generating circuit 121 according to the third embodiment includes an amplitude limit circuit 124 in the reference voltage generating circuit 121 illustrated in FIG. 5.

The amplitude limit circuit 124 includes a resistor R25, a diode D18 and a Zener diode ZD11. One end of the resistor R25 is connected to the output terminal of the operational amplifier 122. The other end of the resistor R25 is connected to the +terminal of the operational amplifier 113.

The Zener diode ZD11 is one that defines the upper limit value of the signal output from the operational amplifier 122. As the Zener diode ZD11, there is used one that has a Zener voltage corresponding to the upper limit value of the output voltage Vout. A cathode of the Zener diode ZD11 is connected to the other end of the resistor R25. An anode of the Zener diode ZD11 is grounded.

A cathode of the diode D18 is connected to the +terminal of the operational amplifier 113. A reference voltage ES16 is supplied to the +terminal of the operational amplifier 113 through the diode D18. The reference voltage ES16 sets the lower limit value of the output voltage Vout.

An explanation will be next given of the operation of the power factor improving converter according to the third embodiment.

The amplitude limit circuit 124 inputs an output voltage output from the operational amplifier 122 through the resistor R25.

Figure 8:
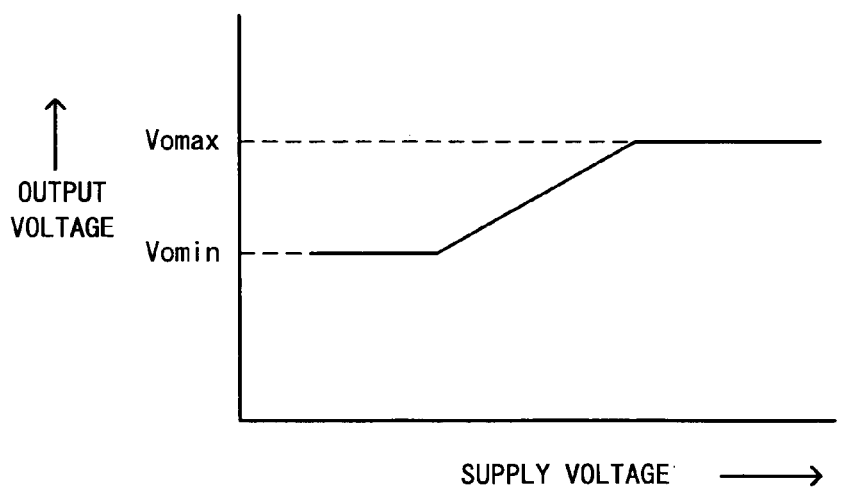
FIG. 8 is an explanatory view illustrating an operation of the power factor improving converter of FIG. 7.

As illustrated in FIG. 8, when the output voltage Vout rises up to an upper limit Vomax, the signal level of the output signal of the operational amplifier 122 reaches the Zener voltage of the Zener diode ZD11. Even if the signal level of the output signal of the operational amplifier 122 becomes high, the Zener diode ZD11 limits the signal level of the output signal of the operational amplifier 122 to the Zener voltage. Accordingly, the output voltage Vout does not exceed the upper limit value Vomax.

Moreover, even if the signal level of the output signal of the operational amplifier 122 is the reference voltage ES16 or less, the reference voltage ES16 is supplied the +terminal of the operational amplifier 113 through the diode D18. For this reason, the output voltage Vout does not reduce below a lower limit value Vomin.

As explained above, according to the present embodiment, since the amplitude limit circuit 124 is provided in the reference voltage generating circuit 121, even if the rectifying voltage fluctuates up and down, the output voltage Vout can be set within a range of the lower limit value Vomin to the upper limit value Vomax.

[Fourth Embodiment]

A power factor improving converter according to a fourth embodiment is one in which a hysterisis characteristic is provided in a relationship between the boost quantity and the output voltage.

Figure 9:
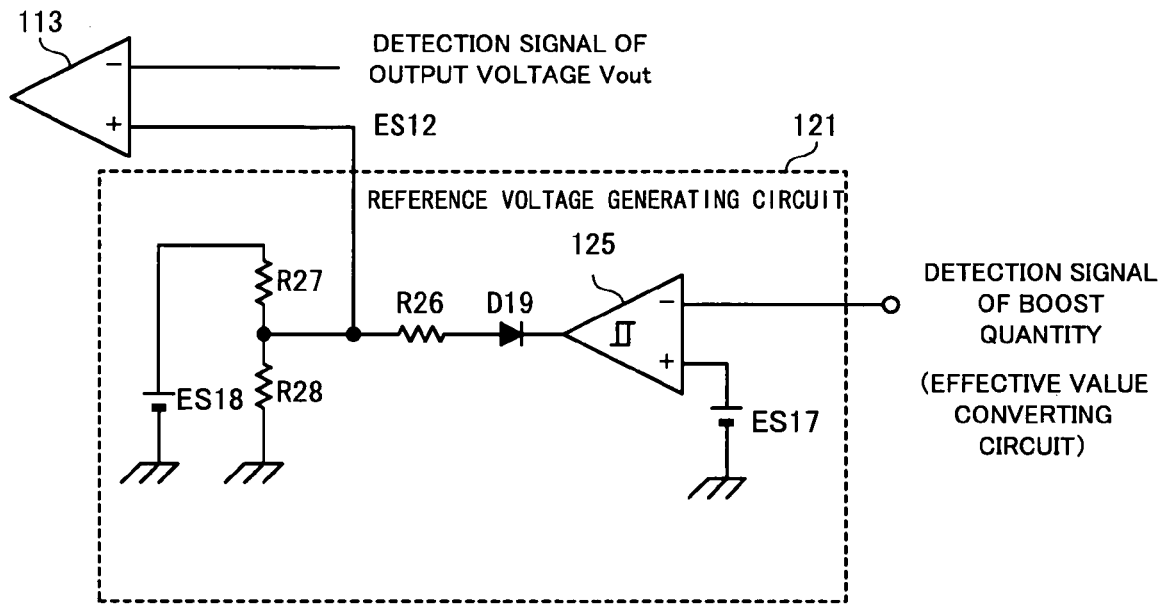
FIG. 9 is a circuit diagram illustrating a configuration of a power factor improving converter according to a fourth embodiment of the present invention.

In the power factor improving converter according to the fourth embodiment, the reference voltage generating circuit 121 includes a comparator 125, a diode D19 and resistors R26 to R28 as illustrated in FIG. 9.

The comparator 125 is one that has a hysterisis characteristic. The effective value converting circuit 111 supplies a boost quantity detection signal to a −terminal of the comparator 125. A reference voltage ES17 is supplied to a +terminal of the comparator 125.

A cathode of the diode D19 is connected to an output terminal of the comparator 125. One end of the resistor R26 is connected to an anode of the diode D19.

A reference voltage ES18 is applied to one end of the resistor R27. One end of the resistor R28 is connected to the other end of the resistor R27. The other end of the resistor R28 is grounded. The other end of the resistor R26 is connected to a junction between the resistor R27 and the resistor R28. Furthermore, the +terminal of the operational amplifier 113 is connected to a junction between the resistor R27 and the resistor R28.

An explanation will be next given of the operation of the power factor improving converter according to the fourth embodiment.

The comparator 125 compares the signal level of the boost quantity detection signal with the reference voltage ES17. When the signal level of the boost quantity detection signal rises and reaches the reference voltage ES17, the comparator 125 outputs a low-level signal. When the output signal of the comparator 125 becomes the low level, current flows into the diode D19. At this time, the resistors R28 and R26 are connected substantially in parallel. At this time, it is assumed that voltage to be supplied to the +terminal of the operational amplifier 113 at this time is Vref1.

Figure 10:
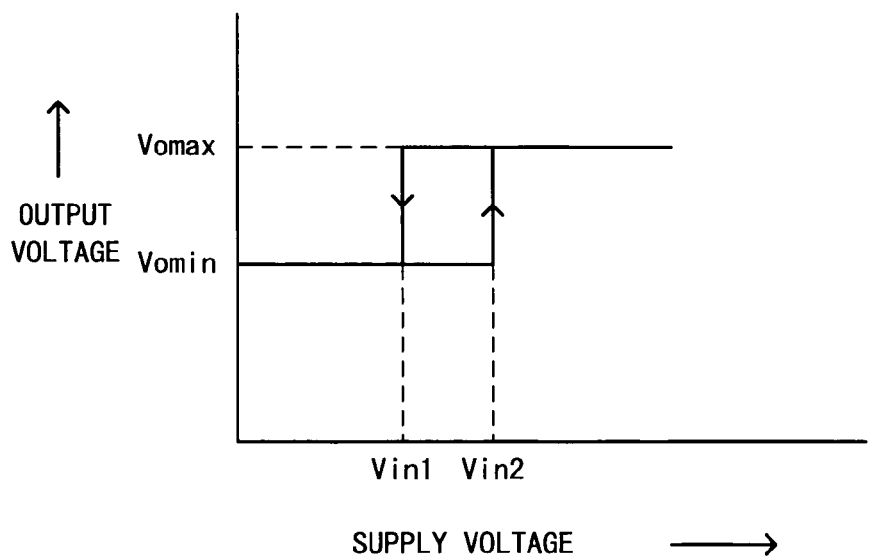
FIG. 10 is an explanatory view illustrating an operation of the power factor improving converter of FIG. 9.

On the other hand, when a high-level signal is output from the comparator 125, no current flows into the diode D19. At this time, the resistors R27 and R28 are connected in series. At this time, it is assumed that voltage to be supplied to the +terminal of the operational amplifier 113 at this time is Vref2. Since Vref1<Vref2, the power factor improving converter has a characteristic as illustrated in FIG. 10.

In other words, when the rectifying voltage Vin rises and the rectifying voltage Vin reaches vin2, the output voltage Vout rises to Vomax. Moreover, when the rectifying voltage Vin reduces and the rectifying voltage Vin reaches vin1, the output Vout decreases to Vomin.

As explained above, according to the present embodiment, since the hysterisis characteristic is provided in the relationship between the boost quantity and the output voltage, an influence due to noise can be prevented to stabilize the operation at the time of switching the output voltage Vout.

[Fifth Embodiment]

A power factor improving converter according to a fifth embodiment is one that includes an oscillator and sets the flip-flop using a pulse signal output from the oscillator in place of the detection signal of the critical current.

Figure 11:
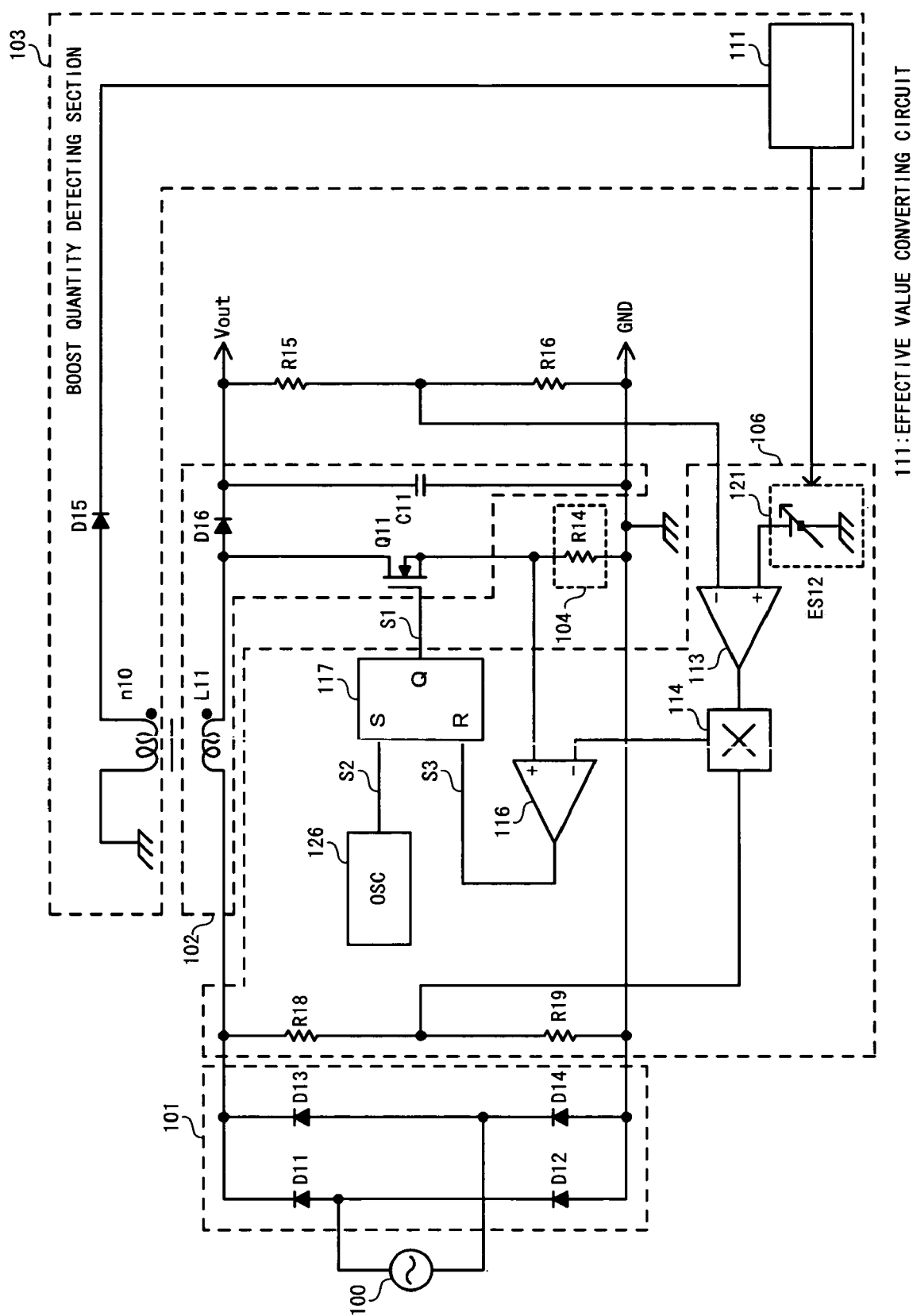
FIG. 11 is a circuit diagram illustrating a configuration of a power factor improving converter according to a fifth embodiment of the present invention.

A configuration of the power factor improving converter according to the fifth embodiment is illustrated in FIG. 11.

The power factor improving converter according to the fifth embodiment includes an oscillator (described as "OSC" in the figure) in the control section 106. The oscillator 126 is included in placed of the comparator 115 of the control section 106 of the power factor improving converters according to the first to fourth embodiments.

In this way, the oscillation 126 is provided, so that the power factor improving converter according to the present embodiment operates similar to the power factor improving converters according to the first to fourth embodiments.

[Sixth Embodiment]

A power factor improving converter of a sixth embodiment is one that obtains on-duty of the switching element as a parameter and controls the target level of the switching current according to the obtained on-duty.

Figure 12:
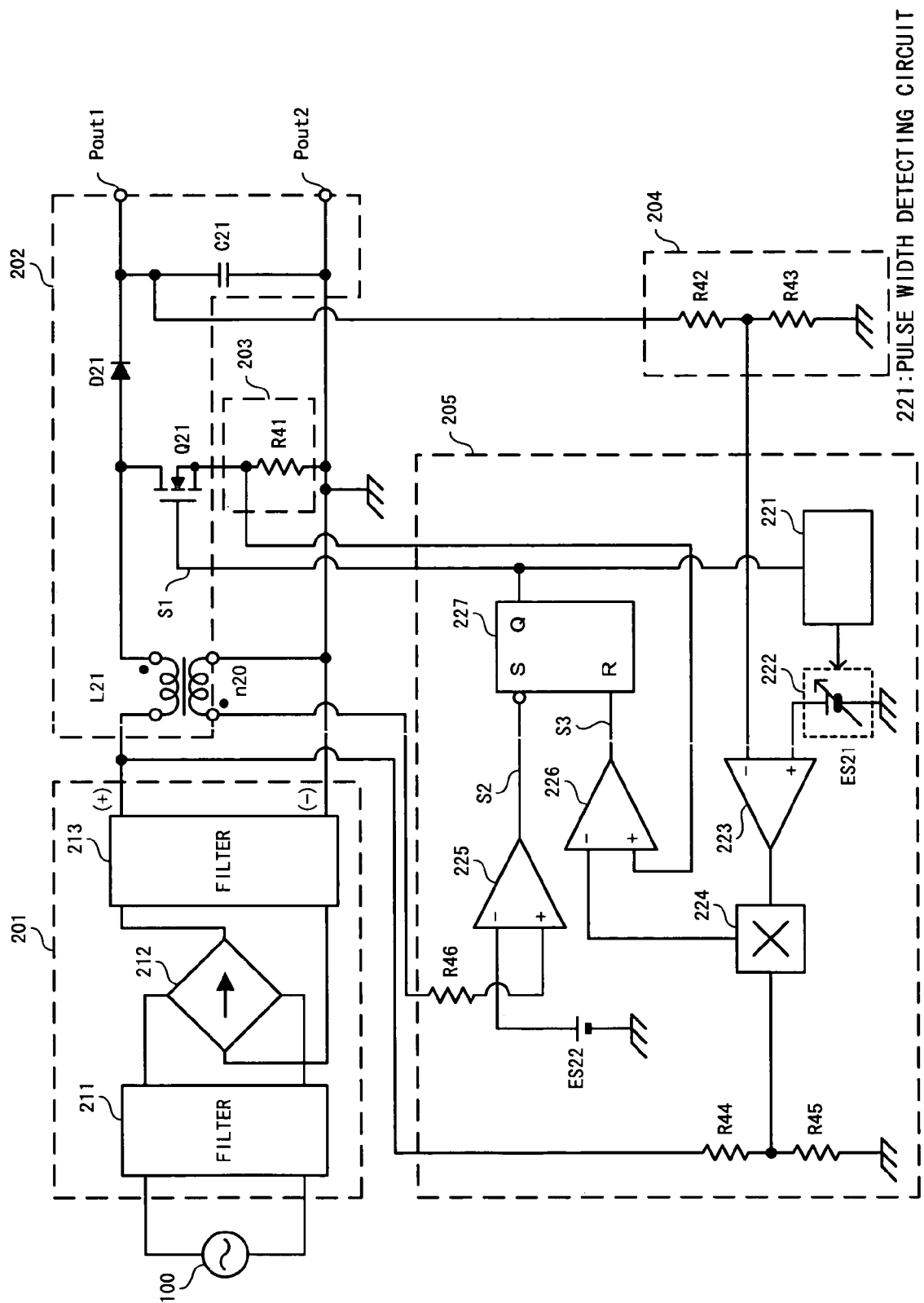
FIG. 12 is a circuit diagram illustrating a configuration of a power factor improving converter according to a sixth embodiment of the present invention.

A configuration of the power factor improving converter according to the sixth embodiment is illustrated in FIG. 12.

The power factor improving converter according to the sixth embodiment includes a rectifying section 201, a voltage converting section 202, a switching current detecting section 203, an output voltage detecting section 204 and a control section 205.

The rectifying section 201 full-wave rectifies AC power supplied from the AC power source 100 to generate a ripple voltage, similar to the rectifying section 101 of FIG. 1. The rectifying section 201 includes a filter 211, a bridge rectifying circuit 212, and a filter 213.

The filters 211 and 213 are those that remove power source noise of the AC 100 or noise from the power factor improving converter. The filter 211 is connected to the AC power 100 and the filter 213 is connected to the bridge rectifying circuit 212.

Figure 13:
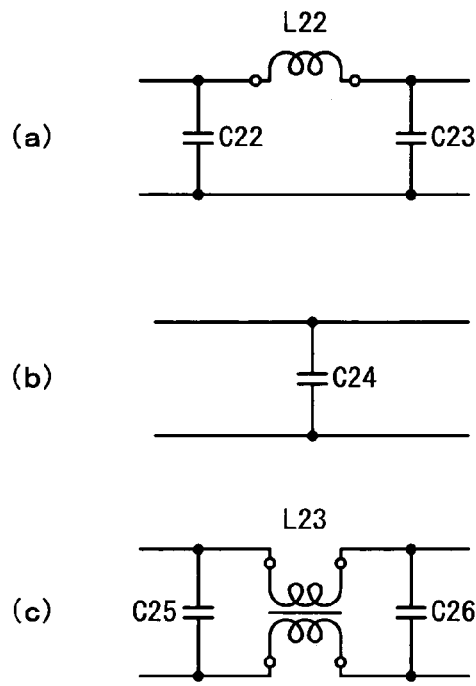
FIG. 13 is a circuit diagram illustrating a configuration of a filter that the power factor improving converter of FIG. 12 includes.

Configurations of the filters 211 and 213 are illustrated in FIGS. 13(a) to (c).

One that is illustrated in FIG. 13(a) is a filter of a π-type normal mode. In this filter, one end of a capacitor C22 and one end of a capacitor C23 are connected to both ends of a coil L22, respectively. The other end of the capacitor C22 and the other end of the capacitor C23 are connected to each other.

One that is illustrated in FIG. 13(b) is the simplest normal mode filter. In this filter, both ends of a capacitor C24 are connected to two lines that are paired, respectively.

One that is illustrated in FIG. 13(c) is a filter in which the normal mode filter and the common mode filter are combined. In this filter, both ends of a capacitor C25 are connected to two input terminals of four terminals, respectively. Moreover, both ends of a capacitor C26 are connected to output terminals. Then, both ends on one line side of a coil L23 are connected between one end of the capacitor C25 and one end of the capacitor C26. Moreover, both ends on the other line side of the coil L23 are connected between the other end of the capacitor C25 and the other end of the capacitor C26.

Backing to FIG. 12, the bridge rectifying circuit 212 includes the diodes D11 to D14 as in the rectifying section 101 illustrated in FIG. 1.

The voltage converting section 202 is one that converts a ripple voltage generated by the rectifying section 201 to a DC output voltage, similar to the voltage converting section 102 illustrated in FIG. 1. The voltage converting section 202 includes an inductor L21, a transistor Q21, a diode D21, and a capacitor C21.

The switching current detecting section 203 is one that detects a switching (drain) current flowing into the transistor Q21, similar to the switching current detecting section 104. The switching current detecting section 203 includes a resistor R41. The resistor R41 is one that converts the switching (drain) current to a voltage signal, and is connected between a source of the transistor Q21 and the ground.

The output voltage detecting section 204 is one that detects an output voltage Vout and outputs the voltage detection signal and includes resistors R42 and R43.

One end of the resistor R42 is connected to one end of the capacitor C21, one end of the resistor R43 is connected to the other end of the resistor R42, and the other end of the resistor R43 is grounded.

The control section 205 is one that supplies a pulse signal as a gate signal to a gate of the transistor Q21 to perform on/off control of the transistor Q21, similar to the control section 106 of FIG. 1. The control section 205 includes a pulse width detecting circuit 221, a reference voltage generating circuit 222, an operational amplifier 223, a multiplier 224, comparators 225, 226, a flip-flop 227, and resistors R44 to R46.

The pulse width detecting circuit 221 is one that detects average on-duty for one cycle of a ripple voltage of the signal S1 supplied to the gate of the transistor Q21. The average on-duty changes when a ratio between the effective value of the ripple voltage and the voltage value of the output voltage changes. Namely, the average on-duty becomes a parameter that indicates the ratio between the effective value of the ripple voltage and the voltage value of the output voltage.

Figure 14:
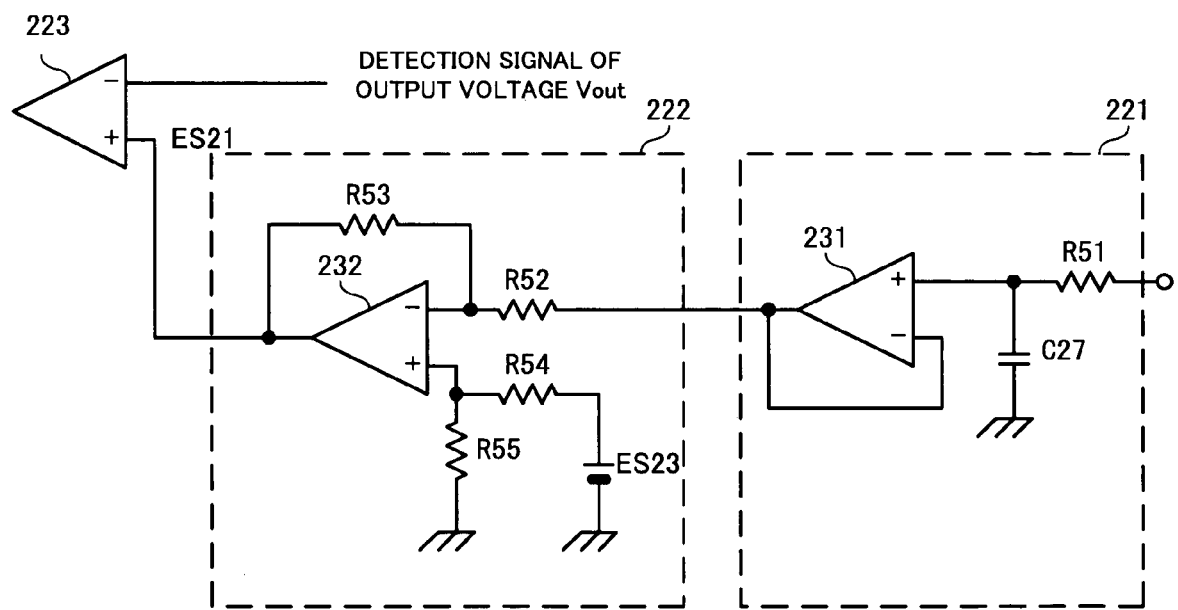
FIG. 14 is a circuit diagram illustrating a configuration of a pulse width detecting circuit and a reference voltage generating that the power factor improving converter of FIG. 12 includes.

The pulse width detecting circuit 221 includes an integrator having an operational amplifier 231, a resistor R51 and a capacitor C27 as illustrated in FIG. 14.

The signal S1 is supplied to one end of the resistor R51. The other end of the resistor R51 is connected to a +terminal of the operational amplifier 231. One end of the capacitor C27 is connected to the other end of the resistor R51. The other end of the capacitor C27 is grounded. An output terminal of the operational amplifier 231 is connected to a −terminal so that the output signal is negatively fed back.

The pulse width detecting circuit 221 outputs the output signal, which is output from the output terminal of the operational amplifier 231 and serves as an average on-duty detection signal (hereinafter simply referred to as "duty detection signal"), to the reference voltage generating circuit 222. A signal level of the duty detection signal (a time ratio for a high-level time during one cycle of a switching cycle) indicates on-duty of the signal S1 supplied to the gate of the transistor Q21.

The reference voltage generating circuit 222 is one that sets a reference voltage ES21 to be supplied to a +terminal of the operational amplifier 223 based on the signal level of the duty detection signal output from the pulse width detecting circuit 221. The reference voltage generating circuit 222 includes an operational amplifier 232 and resistors R52 to R55 as illustrated in FIG. 14.

One end of the resistor R52 is connected to an output terminal of the operational amplifier 231 of the pulse width detecting circuit 221. The other end of the resistor R52 is connected to a −terminal of the operational amplifier 232. One end of the resistor R53 is connected to a −terminal of the operational amplifier 232. The other end of the resistor R53 is connected to an output terminal of the operational amplifier 232. The resistor R53 is a negative feedback resistor to negatively feed back the output signal of the operational amplifier 232. A reference voltage ES23 is supplied to one end of the resistor R54. The other end of the resistor R54 is connected to a +terminal of the operational amplifier 232. One end of the resistor R55 is connected to the +terminal of the operational amplifier 232. The other end of the resistor R55 is grounded.

The power factor improving converter configured in this way controls the voltage level f the output voltage based on the signal level of the duty detection signal.

An explanation will be next given of the operation of the power factor improving converter according to the sixth embodiment.

Figure 15:
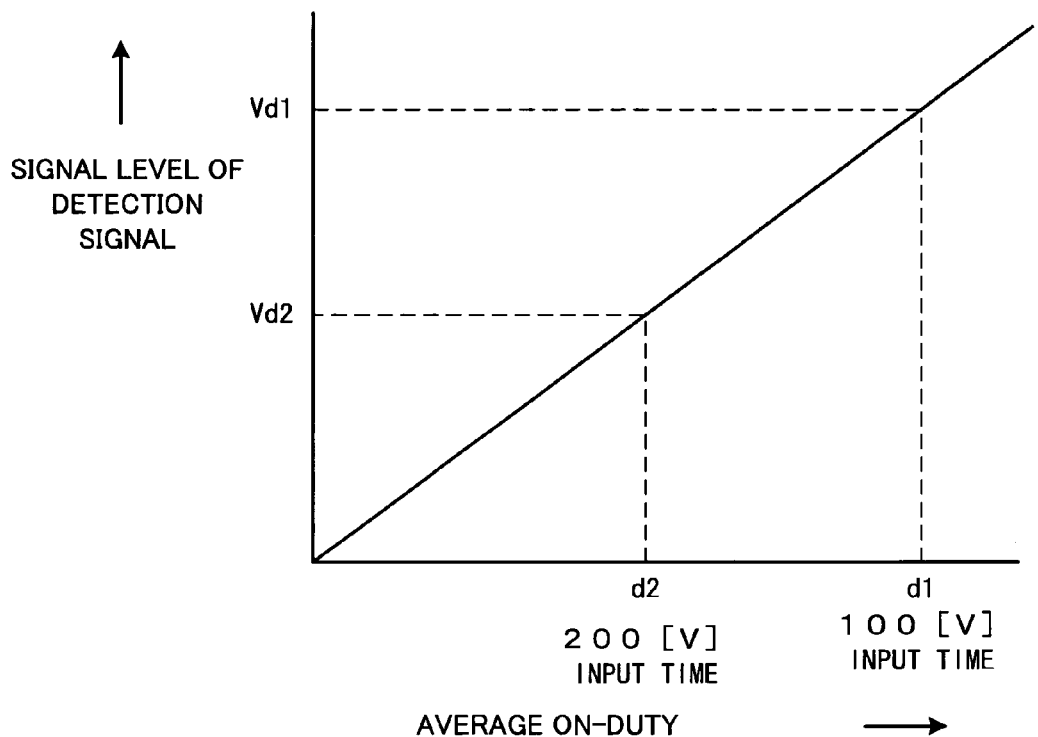
FIG. 15 is an explanatory view illustrating an operation of the power factor improving converter of FIG. 12.

The average on-duty of the signal S1 to be supplied to the gate of the transistor Q21 changes according to the supplied rectifying voltage. The average on-duty increases as the effective value of the supply voltage decreases. In other words, as illustrated in FIG. 15, it is assumed that when the supply voltages are 100V and 200V on the effective values, the average on-duties are d1 and d2, respectively (d2<d1).

When the supply voltage decreases to 100V from 200V, the average on-duty changes to d1 from d2.

In the reference voltage generating circuit 222, when the average on-duty changes from d2 to d1, the signal level of the duty detection signal changes from Vd2 to Vd1. When the signal level of the duty detection signal changes Vd2 to Vd1, the same operation as that of the reference voltage generating circuit 121 as illustrated in FIG. 4 is performed.

Namely, when the signal level of the duty detection signal of the pulse width detecting circuit 221 increases, the reference voltage ES21 decreases. When the reference voltage ES21 decreases, the target level of the switching current decreases, so that the output voltage Vout also decreases.

As explained above, according to the present embodiment, the effective value of the supply voltage is determined based on the on-duty of the switching element to control the output voltage based on the effective value of the supply voltage. Accordingly, when the input condition changes to decrease the input voltage, boost energy also reduces by reducing the boost ratio, thereby making it possible to reduce the switching loss and largely improve efficiency.

Moreover, since the average on-duty is obtained based on the gate signal to be supplied to the gate of the transistor Q21 to switch the output voltage Vout, switch processing of the output voltage Vout can be performed in only the interior of the control section 205 and the number of pins may be small when the control section 205 is converted to IC to make it possible to reduce the cost of IC.

In addition, it is possible to prevent a voltage dip at a load suddenly changing time. The operation is illustrated in FIG. 16.

Figure 16:
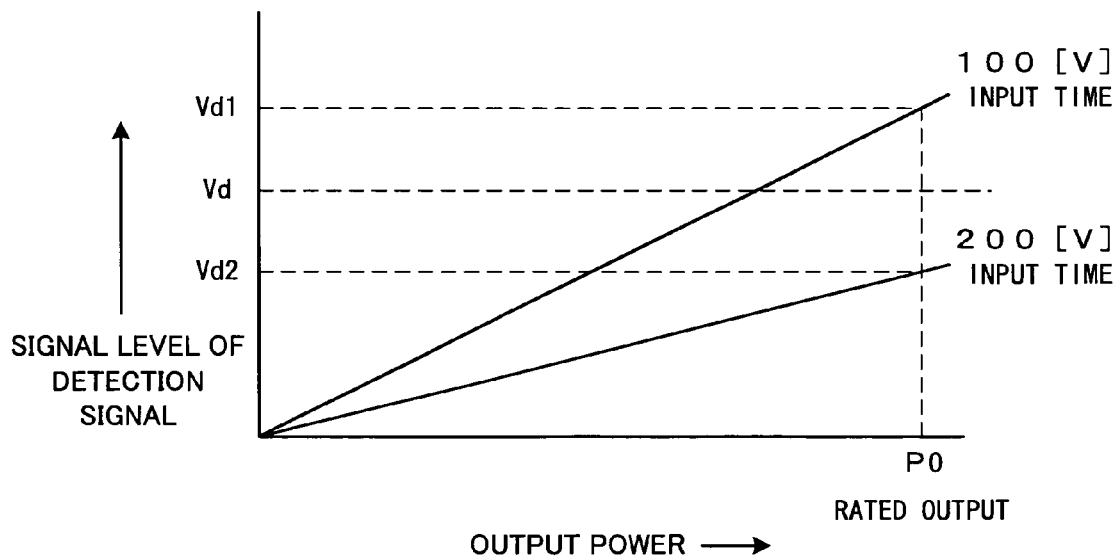
FIG. 16 is an explanatory view illustrating an operation of the power factor improving converter of FIG. 12.

First of all, in FIG. 16, 200V input time is compared with 100V input time when output power is a rated output P0. When the signal level of the duty detection signal is Vd2 at the 200V input time, the signal level of the duty detection signal becomes Vd1 at the 100V input time (Vd2<Vd1). The higher the signal level of the duty detection signal becomes, the lower the target level of the switching current becomes. Moreover, when the target level of the switching current decreases, the output voltage Vout decreases. Accordingly, the output voltage Vout at the 100V input time becomes lower than the case at the 200V input time.

Furthermore, comparison between a light load time and a heavy load time at the 100V input time is performed. The signal level of the duty detection signal at the heavy load time becomes higher than the case at the light load time. For this reason, the output voltage Vout at the heavy load time becomes lower than the case at the light load time.

Herein, when it is assumed that the output voltage Vout is switched, a threshold Vd of the signal level of the duty detection signal is set to Vd2<Vd<Vd1 as illustrated in FIG 16.

When the duty detection signal becomes higher than Vd, the output voltage Vout decreases. Moreover, when the duty detection signal becomes lower than Vd, the output voltage Vout increases. Namely, the output voltage Vout increases at the light load time and the output voltage Vout decreases at the heavy load time.

In this way, since the output voltage Vout is switched based on the gate signal supplied to the gate of the transistor Q21, not only the input condition but also the light and heavy load as the output condition is added to the switching condition and the DC output voltage Vout can be rationally switched.

Furthermore, since a smoothing capacitor is charged by a high voltage at the time of the light load, it is possible to prevent the voltage dip at the DC output voltage Vout even if the load changes sharply.

[Seventh Embodiment]

A power factor improving converter according to a seventh embodiment is one that is configured in such a way to switch the output voltage in two stages based on the average on-duty. Moreover, this power factor improving converter is configured in such a way to provide the hysterisis characteristic in a relationship between the average on-duty and the output voltage.

The power factor improving converter according to the seventh embodiment is configured, similar to the sixth embodiment illustrated in FIG. 12.

Figure 17:
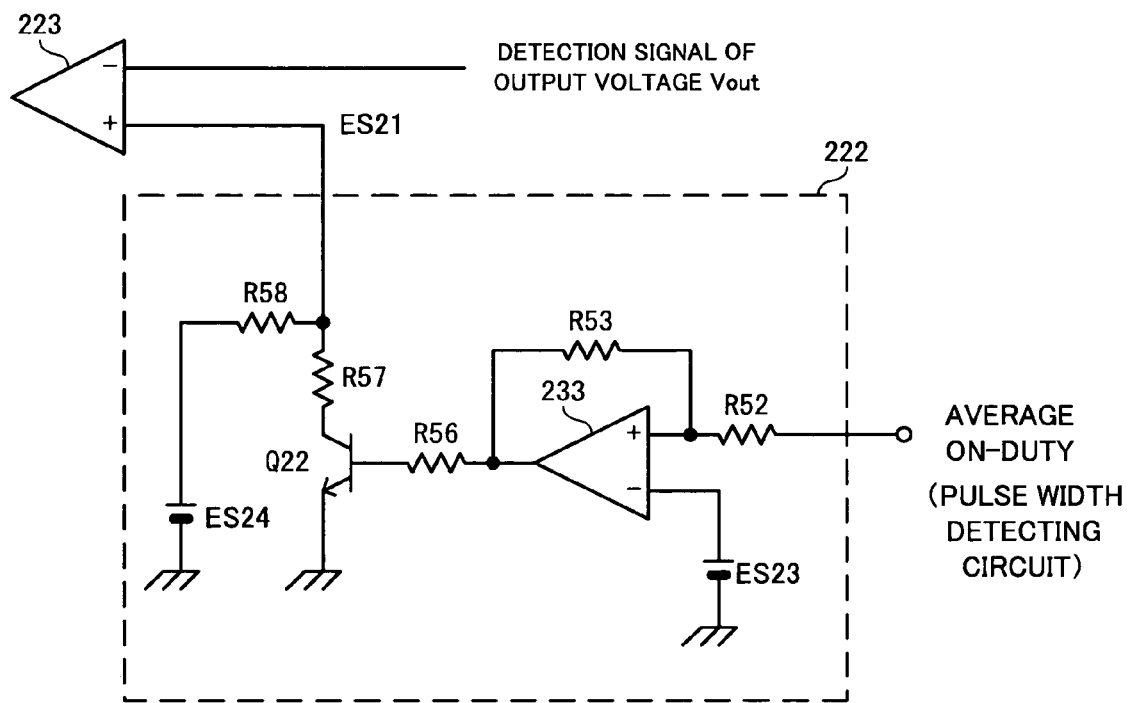
FIG. 17 is a circuit diagram illustrating a configuration of a power factor improving converter according to a seventh embodiment of the present invention.

In addition, the power factor improving converter according to the seventh embodiment includes a reference voltage generating circuit 222 configured as illustrated in FIG. 17.

The reference voltage generating circuit 222 uses a comparator 233 in place of the operational amplifier 232 illustrated in FIG. 14. Furthermore, the reference voltage generating circuit 222 further includes a transistor Q22 and resistors R56 to R58. Moreover, a detection signal of the average on-duty is supplied to a +terminal of the comparator 233 through the resistor R52. The reference voltage ES23 is supplied to a −terminal of the comparator 233.

The transistor Q22 is configured by an NPN type bipolar transistor.

The resistor R56 is connected between an output terminal of the comparator 233 and a base of the transistor Q22. One end of the resistor R57 is connected to a +terminal of the operational amplifier 223. The other end of the resistor R57 is connected to a collector of the transistor Q22. An emitter of the transistor Q22 is grounded. One end of the resistor R58 is connected to one end of the resistor R57. A reference voltage ES24 is supplied to the other end of the resistor R58.

An explanation will be next given of the operation of the power factor improving converter according to the seventh embodiment.

The comparator 233 outputs a high-level signal when the signal level of the duty detection signal, which indicates an average on-duty, becomes higher than the voltage supplied to the −terminal. The transistor Q22 turns on by the high-level signal and the signal level to be supplied to the +terminal of the operational amplifier 223 decreases. When the output voltage Vout is made substantially constant, the signal level of the output signal of the operational amplifier 223 reduces. When the signal level of the output signal of the operational amplifier 223 reduces, the target level of the switching current reduces and the output voltage Vout reduces.

Figure 18:
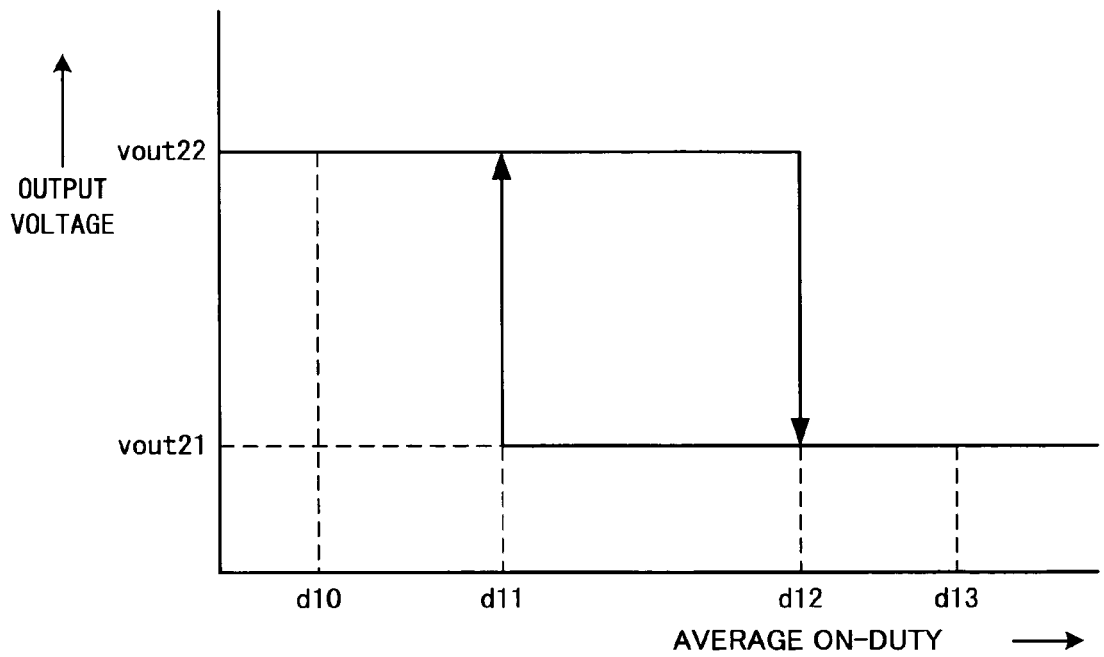
FIG. 18 is an explanatory view illustrating an operation of the power factor improving converter of FIG. 17.

The relationship between the average on-duty and the output voltage Vout is illustrated in FIG. 18.

Additionally, in the figure, the average on-duty has a relationship of d10<d11<d12<13, and the output voltage has a relationship of vout21<vout22. Moreover, a constant of each resistor of the reference voltage generating circuit 222 is set in such a way that the transistor Q22 turns on when the average on-duty is d12.

In a case where the average on-duty increases from d10, the output voltage Vout becomes vout21 when the average on-duty is d12.

Moreover, in a case where the average on-duty decreases from d13, the output voltage Vout is vout21 as it is by the resistor R53 as a negative feedback resistor even if the average on-duty decreases to d12. Then, when the average on-duty decreases up to d11, the output voltage Vout becomes vout22.

In this way, the power factor improving converter according to this embodiment provides a hysterisis characteristic as illustrated in FIG. 18 between the average on-duty and the output voltage Vout, thereby making it possible to prevent the voltage Vout from becoming unstable at the switching time.

In addition, the average on-duty is divided into, for example, three stages to make it possible to vary the output voltage Vout and provide the hysterisis for each stage.

Figure 19:
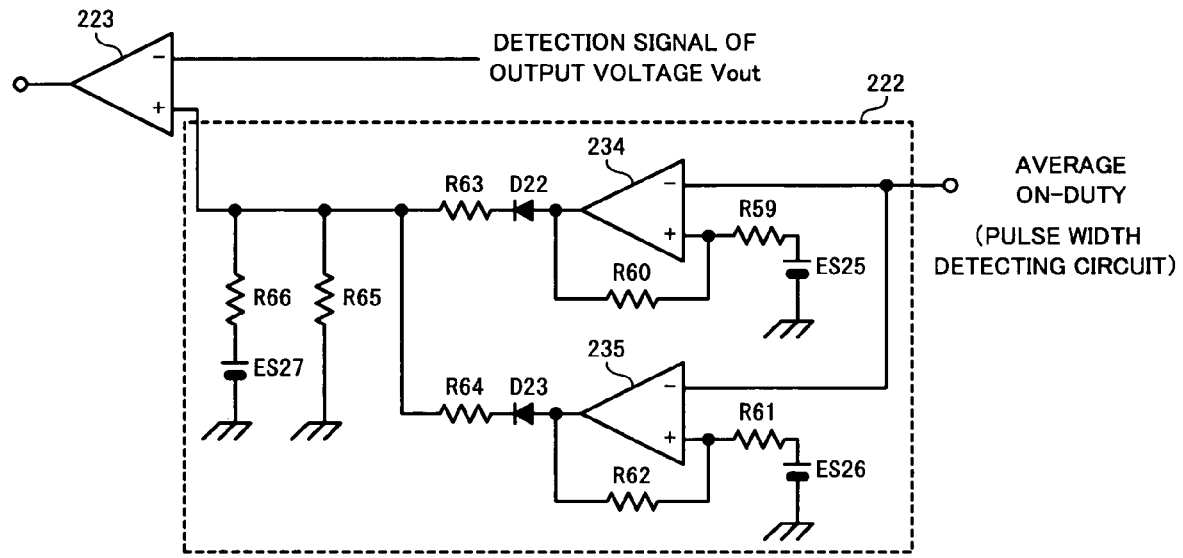
FIG. 19 is a circuit diagram illustrating another configuration of the power factor improving converter according to the seventh embodiment of the present invention.

A configuration of the reference voltage generating circuit 222 in this case is illustrated in FIG. 19.

The reference voltage generating circuit 222 is configured to include comparators 234, 235, diodes D22, D23, and resistors R59 to R66.

The duty detection signal is supplied to a −terminal of each of the comparators 234 and 235.

Figure 20:
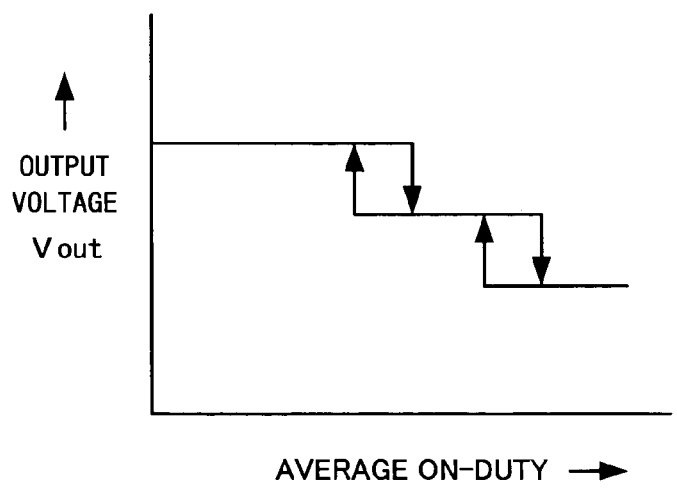
FIG. 20 is an explanatory view illustrating an operation of the power factor improving converter illustrated in FIG. 19.

The reference voltage generating circuit 222 is thus configured, and thereby the average on-duty is divided into three stages to switch the output voltage Vout based on the voltage signal supplied from the pulse width detecting circuit 221 as illustrated in FIG. 20.

By performing such control, when an input voltage to be input from the AC power source 100 is low and the average on-duty is high, a DC output voltage Vout decreases as illustrated in FIG. 20. When the input voltage is an intermediate voltage, the DC output voltage Vout becomes an intermediate voltage. Then, when the input voltage is high and the average on-duty is low, the DC output voltage Vout increases. Moreover, the hysterisis is provided between the average on-duty of each stage and the DC output voltage as illustrated in FIG. 20, thereby making it possible to further prevent the output voltage Vout from becoming unstable at the switching time.

[Eighth Embodiment]

A power factor improving converter according to an eighth embodiment is one that changes the reference voltage to be inversely proportional to the average on-duty and provides an upper limit value and a lower limit value to the output voltage.

The power factor improving converter according to the eighth embodiment is configured, similar to the sixth embodiment illustrated in FIG. 12.

Figure 21:
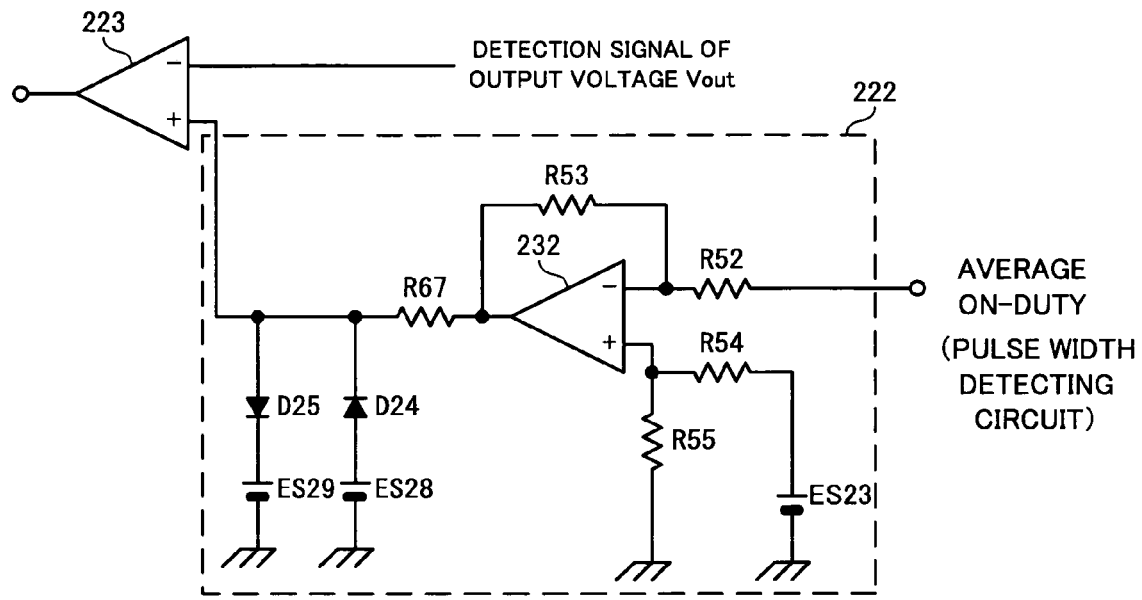
FIG. 21 is a circuit diagram illustrating a configuration of a reference voltage generating circuit that a power factor improving converter according to an eighth embodiment of the present invention includes.

In addition, the power factor improving converter according to the eighth embodiment includes the reference voltage generating circuit 222 configured as illustrated in FIG. 21.

The reference voltage generating circuit 222 includes diodes D24, D25 and a resistor R67 in addition to the configuration illustrated in FIG. 14.

Figure 22:
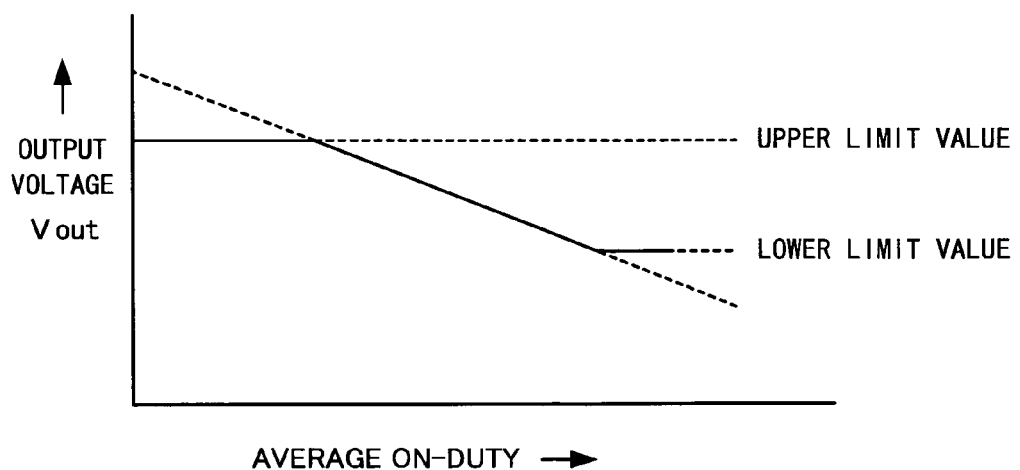
FIG. 22 is an explanatory view illustrating an operation of the power factor improving converter according to the eighth embodiment of the present invention.

The power factor improving converter configured in this way has a characteristic as illustrated in FIG. 22.

A reference voltage ES28 is set to correspond to the lower limit value of the output voltage Vout. Moreover, a reference voltage ES29 is set to correspond to the upper limit value of the output voltage Vout.

Even if the average on-duty increases and the output level of the operational amplifier 232 is higher than the reference voltage ES29, voltage defined by the reference voltage ES29 is applied to a +terminal of the operational amplifier 223.

Moreover, even if the average on-duty decreases and the output level of the operational amplifier 232 is lower than the reference voltage ES28, a fixed reference voltage ES28 defined by the reference voltage ES28 is applied to the +terminal of the operational amplifier 223.

The reference voltage generating circuit 222 configured in this way, thereby the power factor improving converter has the characteristic as illustrated in FIG. 22 and an upper limit value and a lower limit value are provided to the output voltage Vout.

Furthermore, the upper limit value and the lower limit value are set to the output voltage Vout, thereby making it possible to protect the load connected to terminals Pout1 and Pout2.

Figure 23:
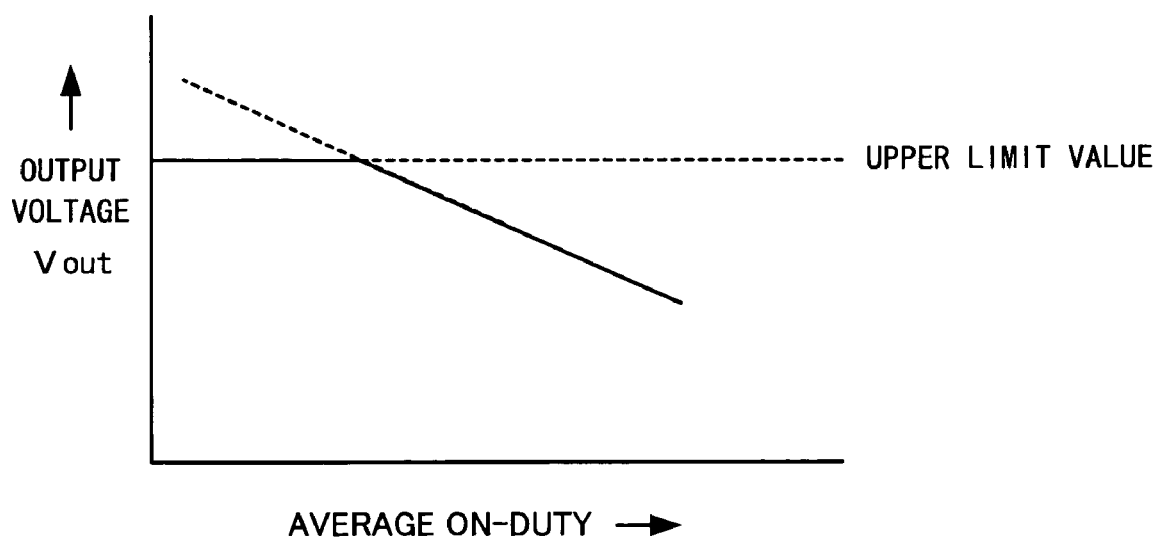
FIG. 23 is an explanatory view illustrating an operation to which the power factor improving converter according to the eighth embodiment of the present invention is applied.

In addition, if neither the diode D24 nor the reference voltage ES28 is provided, only the upper limit value can be provided to the output voltage Vout as illustrated in FIG. 23.

Moreover, if neither the diode D25 nor the reference voltage ES29 is provided, only the lower limit value can be provided to the output voltage Vout.

Furthermore, neither the upper limit value nor the lower limit value can be provided to the output voltage Vout. In this case, the output voltage Vout linearly changes in accordance with the change in the average on-duty as illustrated by a broken line of FIG. 22.

[Ninth Embodiment]

A power factor improving converter according to a ninth embodiment is one in which a timer is provided and even if the output voltage changes, this change is delayed by the timer.

Figure 24:
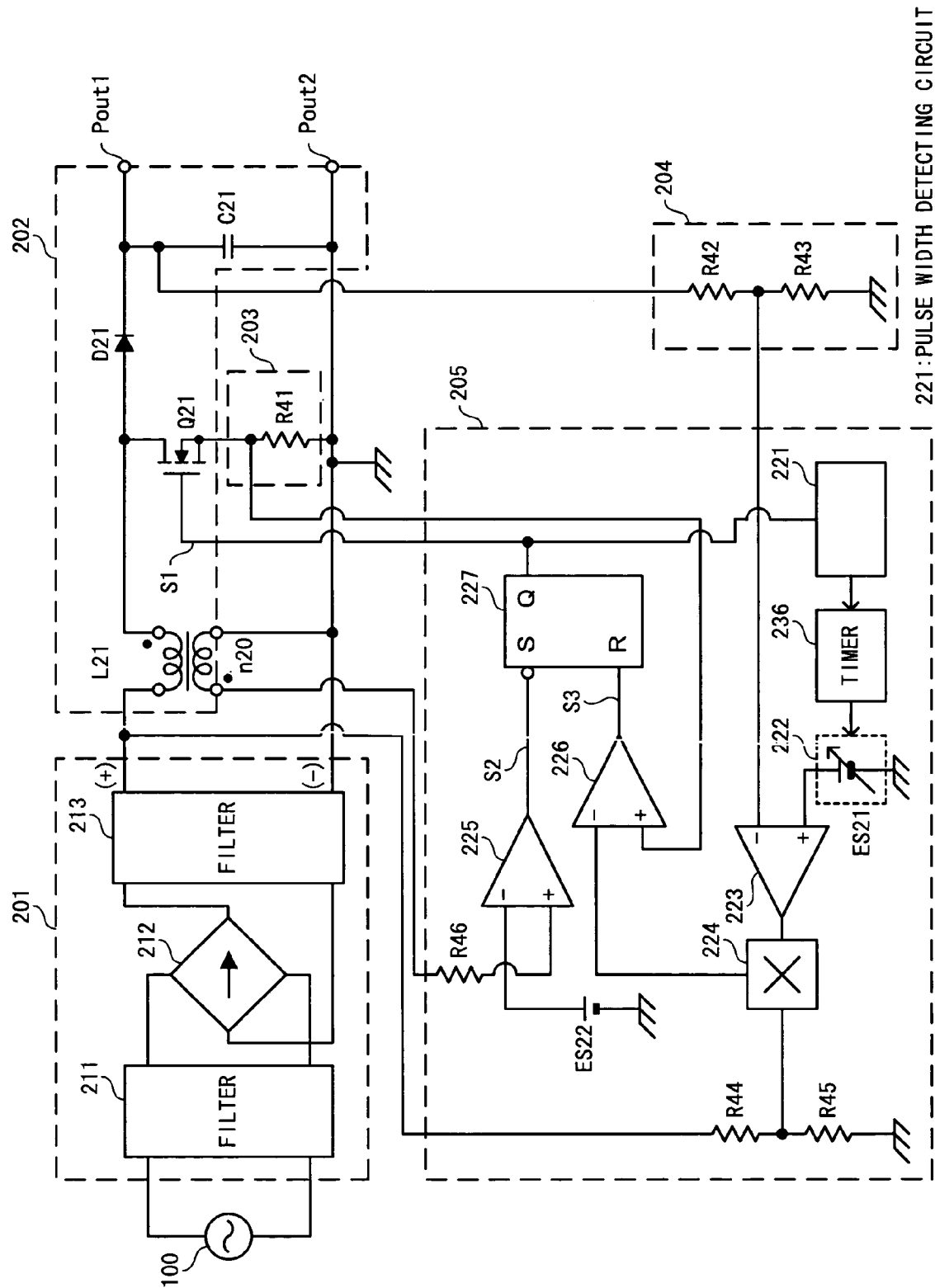
FIG. 24 is a circuit diagram illustrating a configuration of a power factor improving converter according to a ninth embodiment of the present invention.

A configuration of the power factor improving converter according to the ninth embodiment is illustrated in FIG. 24. In the power factor improving converter according to the ninth embodiment, a timer 236 is connected between the pulse width detecting circuit 221 and the reference voltage generating circuit 222.

The timer 236 delays control to the reference voltage ES21 due to the duty detection signal detected by the pulse width detecting circuit 221 by a predetermined time.

Figure 25:
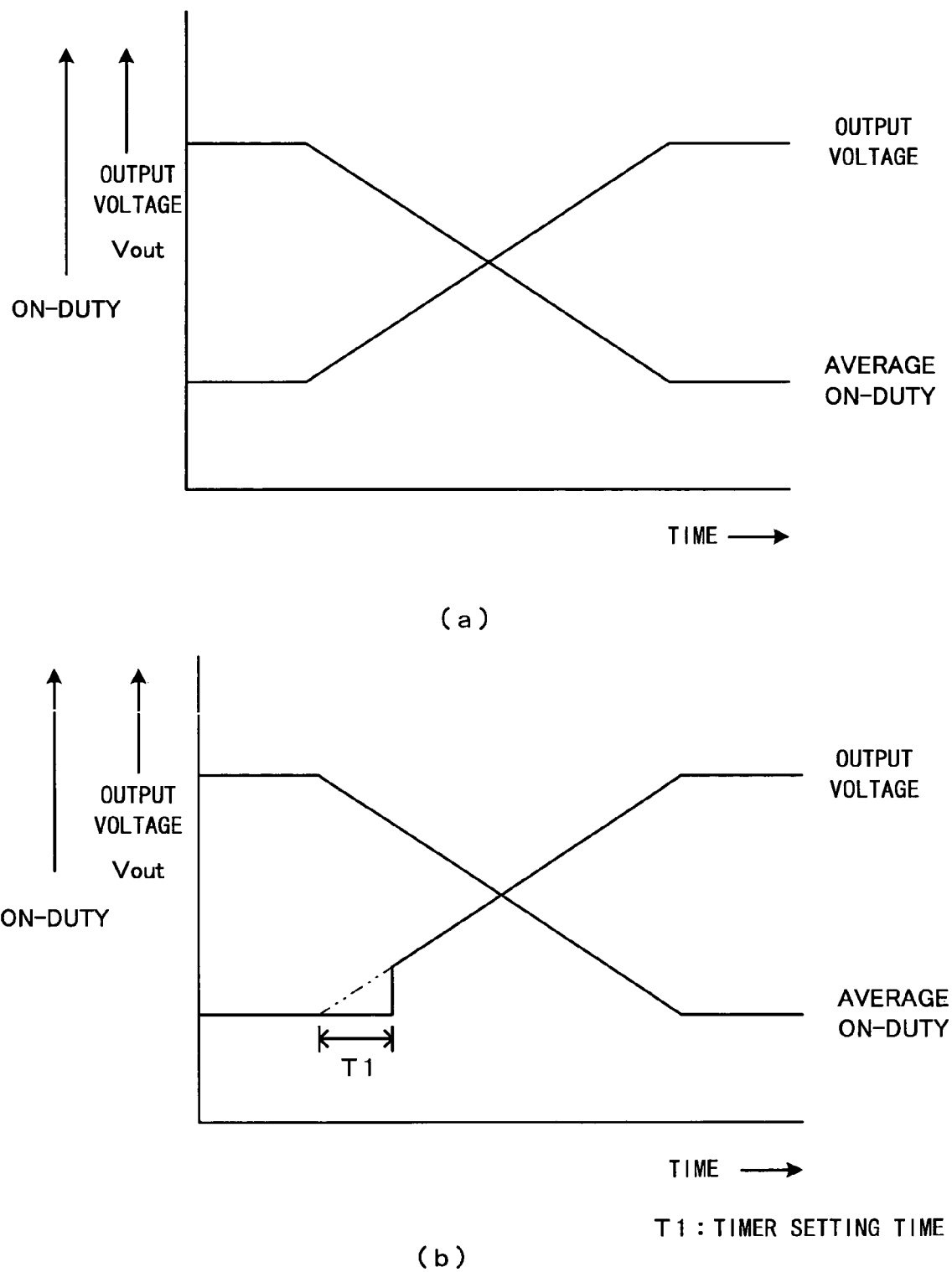
FIG. 25 is an explanatory view illustrating an operation of the power factor improving converter of FIG. 24.

This operation is illustrated in FIG. 25.

FIGS. 25(a) and (b) are explanatory views using the timer 236.

Unless the timer 236 is used, when the average on-duty transits from a low state to a high state, the output voltage Vout increases with time as illustrated in FIG. 25(a).

In contrast to this, in the power factor improving converter according to the ninth embodiment, by providing the time 236, the timer 236 holds the signal level of the duty detection signal by a set fixed time. For this reason, when the average on-duty transits from the low state to the high state, the output voltage Vout is unchanged until a fixed time T1 passes as illustrated in FIG. 25(b). After the fixed time T1 passes, the output voltage Vout changes.

This makes it possible to prevent the output voltage Vout from being changed by, for example, a temporary load variation.

Figure 27:
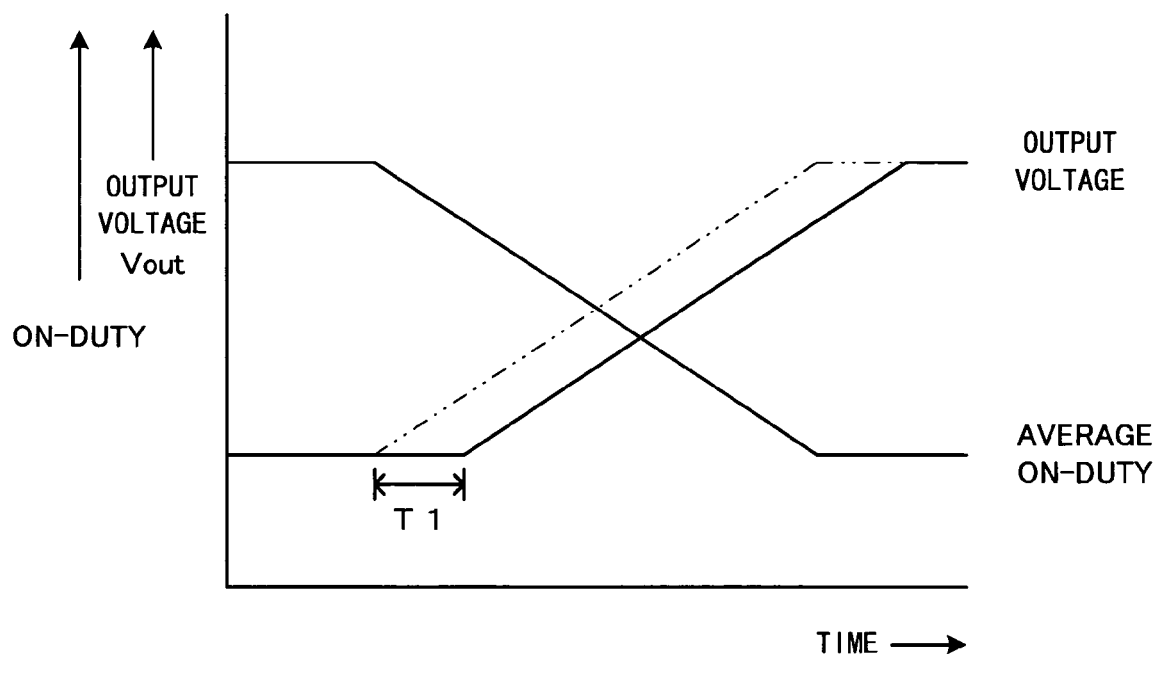
FIG. 27 is an explanatory view illustrating an operation of the power factor improving converter of FIG. 26.

In addition, such an effect can be also attained by enhancing the resistor value of the resistor R51 of the pulse width detecting circuit 221 to increase delay time at time when the average on-duty is detected. In this case, the output voltage Vout slowly changes as illustrated in FIG. 27 instead of a rapid rise as illustrated in FIG. 25(b).

Figure 26:
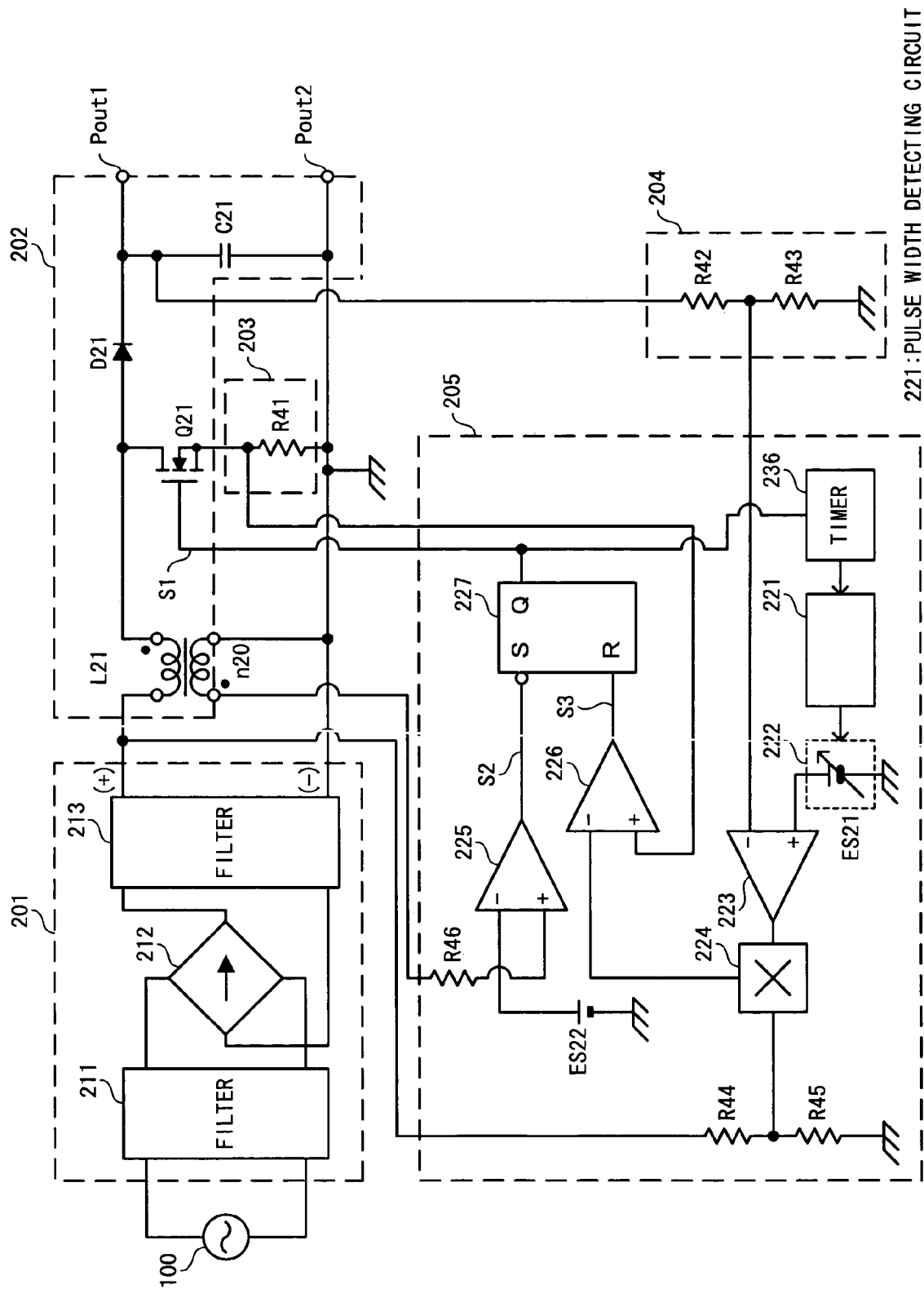
FIG. 26 is a circuit diagram illustrating a configuration to which the power factor improving converter according to the ninth embodiment of the present invention is applied.

Furthermore, the timer 236 can be connected between the gate of the transistor Q21 and the pulse width detecting circuit 221 as illustrated in FIG. 26.

[Tenth Embodiment]

A power factor improving converter according to a tenth embodiment is one that detects output power and controls the output voltage based on the average on-duty and the output power.

Figure 28:
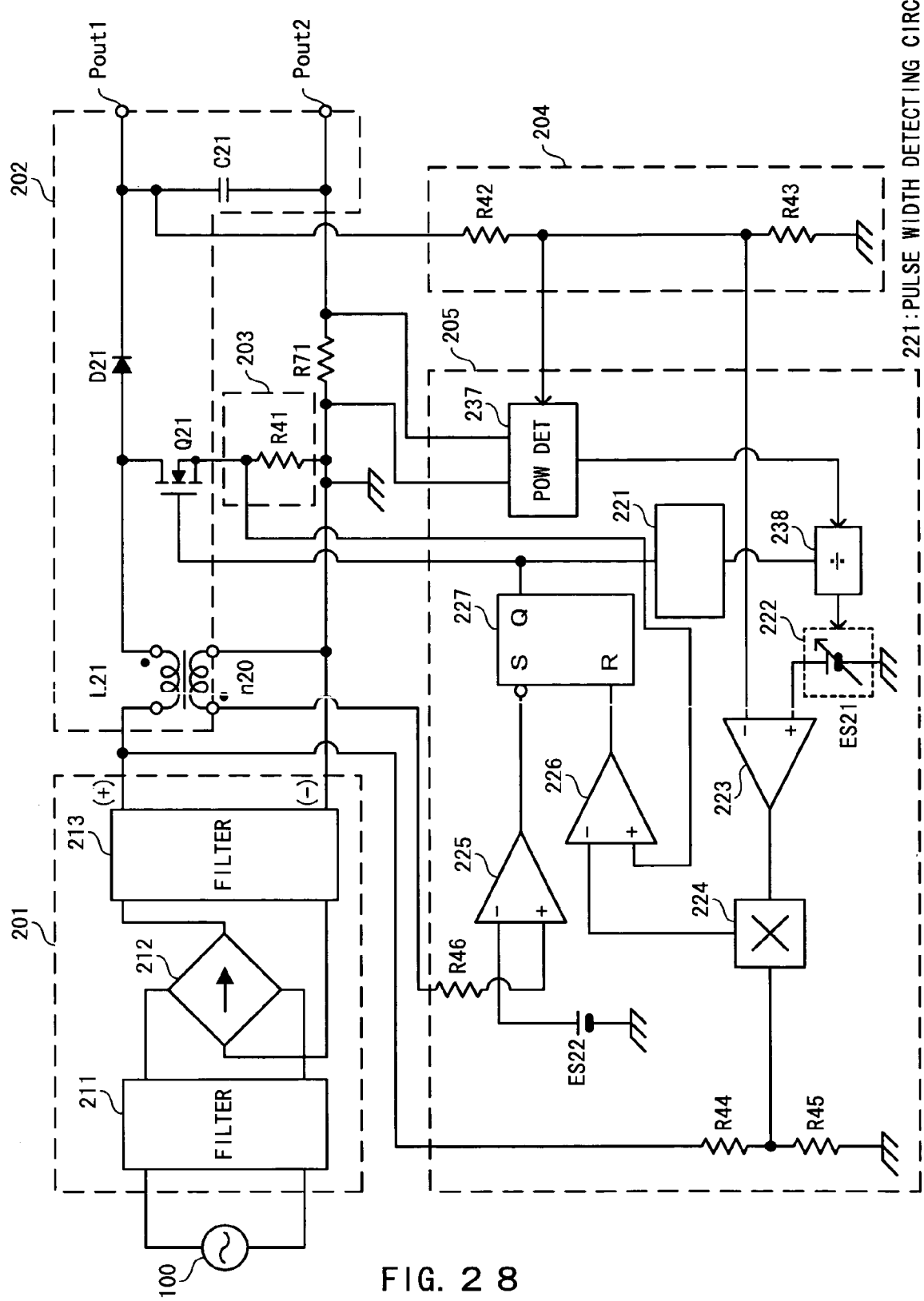
FIG. 28 is a circuit diagram illustrating a configuration of a power factor improving converter according to a tenth embodiment of the present invention.

A configuration of the power factor improving converter according to the tenth embodiment is illustrated in FIG. 28.

In the power factor improving converter according to the tenth embodiment, a resistor R71 is interposed between a −terminal of the capacitor C21 of the voltage converting section 202 and the resistor R41, and a power detector (described as "POW DET" in the figure) 237 and a divider 238 are included in the control section 205.

The resistor R71 is a resistor that detects an output current as a voltage signal.

The power detector 237 outputs a power detection signal indicating an output power based on the output current detection signal detected by the resistor R71 and a voltage detection signal of an output voltage Vout.

The divider 238 divides a signal level of the power detection signal output from the power detector 237 by a signal level of the duty detection signal detected by the pulse width detecting circuit 221.

Figure 29:
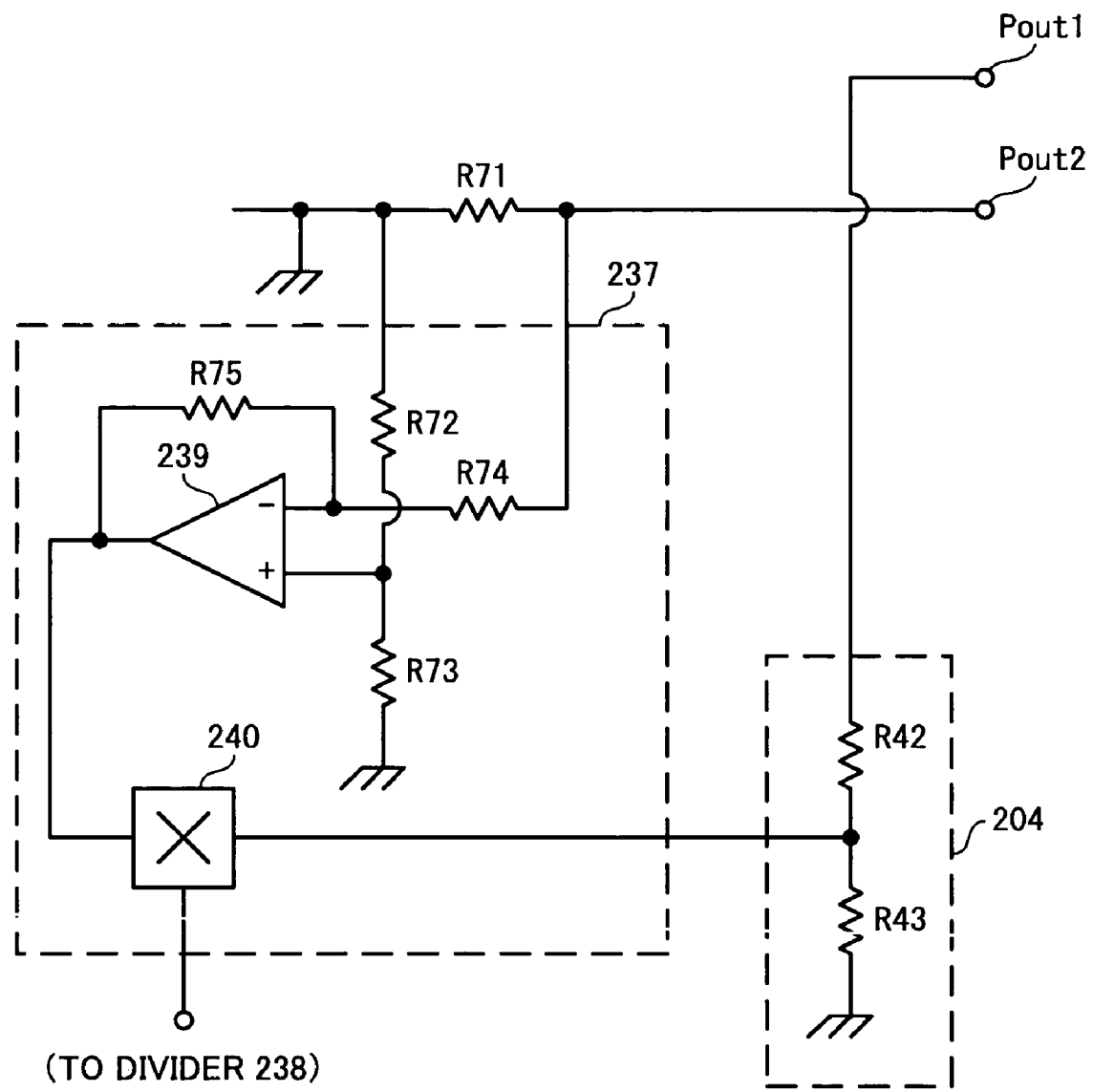
FIG. 29 is a circuit diagram illustrating a configuration of a power detecting circuit that the power factor improving converter of FIG. 28 includes.

A configuration of the power detector 237 is illustrated in FIG. 29.

The power detector 237 is configured to include an operational amplifier 239, a multiplier 240 and resistors R72 to R75.

An output current flowing into the resistor R71 is amplified by the operational amplifier 239 and the resistors R72 to R75, and the multiplier 240 multiplies the detection signal of the output current and the detection signal of the output voltage Vout. An output of the multiplier 240 is a power detection signal corresponding to the output power.

The divider 238 shown in FIG. 28 divides the signal output by the multiplier 240 by the signal level of the duty detection signal detected by the pulse width detecting circuit 221.

The output of the divider 238 corresponds to the input voltage Vin supplied from the AC power source 100.

In other words, the input voltage Vin is expressed by the following equation (2).

$$Vin = ((Vout \times Iout)/Iin) \qquad (2)$$

where Vout: output voltage,
Iin: input current,
Iout: output current.

The reference voltage generating circuit 222 generates a reference voltage ES21 based on the signal output from the divider 238. The operational amplifier 223 compares the signal level of the voltage detection signal with the reference voltage ES21. As a result, the output voltage Vout is controlled by the signal level corresponding to the input voltage Vin.

By the configuration in this way, even if the output current Iout varies, the input current In varies in the same way as the output current Iout and the input voltage Vin does not change. For this reason, the level by the output voltage Vout is changed is not varied by the output current Iout, thereby making it possible to accurately set a target level of the switching current and to control the output voltage Vout.

[Eleventh Embodiment]

A power factor improving converter according to an eleventh embodiment is one in which the voltage converting section is configured by an insulating type converter.

Figure 30:
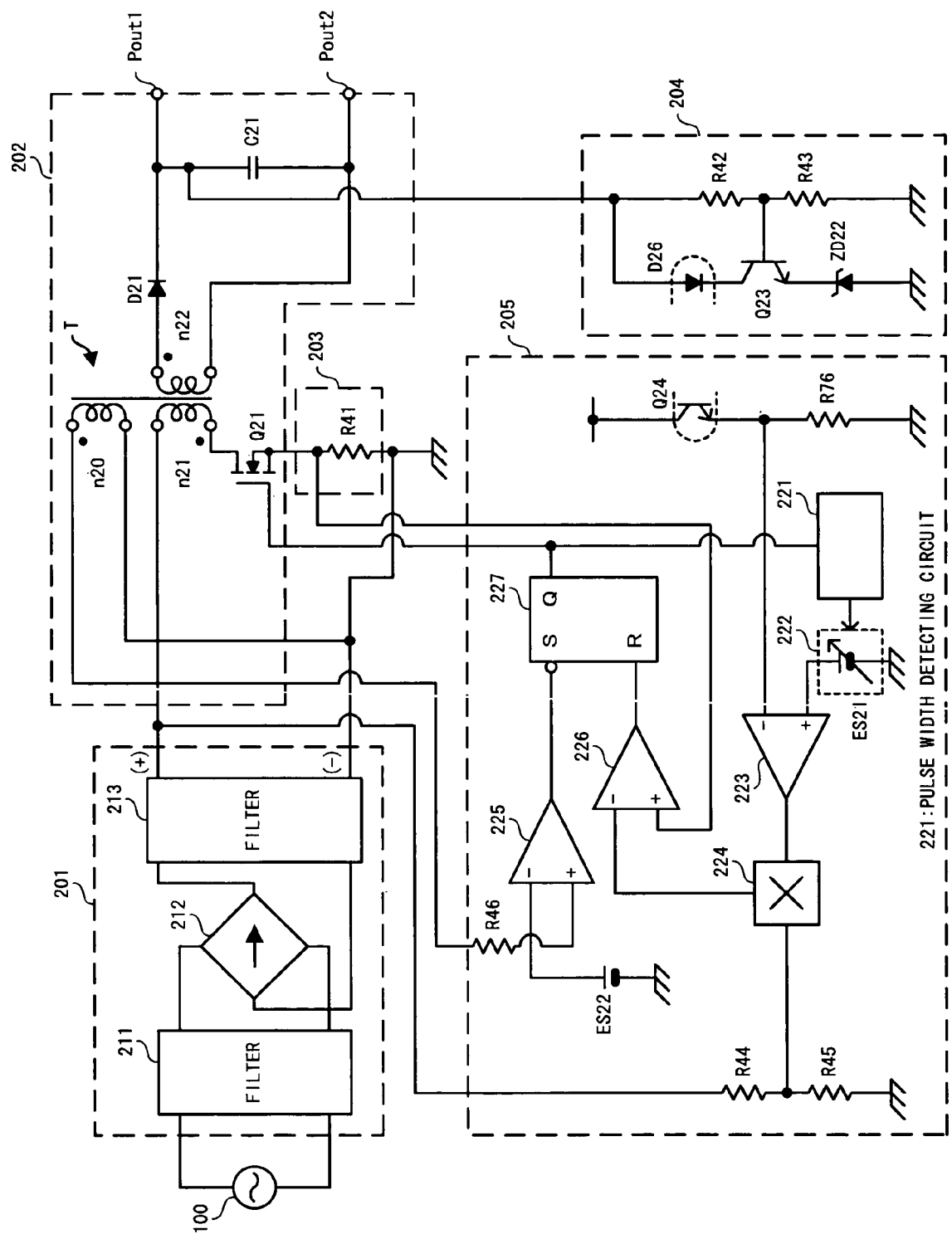
FIG. 30 is a circuit diagram illustrating a configuration of a power factor improving converter according to an eleventh embodiment of the present invention.

A configuration of the power factor improving converter according to the eleventh embodiment is illustrated in FIG. 30. In the power factor improving converter according to the eleventh embodiment, a transformer T having windings n21, n22, n20 is included in the voltage converting section 202. The windings n21 and n22 are used as windings for a primary side and a secondary side, respectively. Moreover, the winding n20 is a winding for detecting a critical current.

Furthermore, in order to insulate the primary side and the secondary side of the transformer T from each other, the power factor improving converter according to the present embodiment includes a photocoupler having a photodiode D26 and a phototransistor Q24.

The output voltage detecting section 204 is configured to include the resistors R42, R43, the transistor Q23 as an NPN bipolar transistor, a Zener diode ZD 22 and the photodiode D26.

An anode of the photodiode D26 is connected to an output terminal Pout1, and a cathode is connected to a collector of the transistor Q23. An emitter of the transistor Q23 is connected to a cathode of the Zener diode ZD22 and a base is connected to a junction between the resistor R42 and the resistor R43. An anode of the Zener diode ZD22 is grounded.

The phototransistor Q24 is included in the control section 205. A collector of the phototransistor Q24 is connected to a DC power source, and an emitter is connected to a -terminal of the operation amplifier 223. One end f the operational amplifier 223 is connected to the resistor R76 and the other end of the resistor R76 is grounded.

By the configuration in this way, current flowing between the collector and the emitter of the transistor Q23 is controlled according to the voltage level of the output voltage Vout. The photodiode D26 emits with an amount of emission according to the current flowing between the collector and the emitter of the transistor Q23.

Light generated when the photodiode D26 emits is received by the phototransistor Q24 and an amount of current flowing into the phototransistor Q24 is controlled by the amount of received light. Accordingly, the voltage detection signal of the output voltage Vout is supplied to the control section 205 while the primary side and the secondary side of the transformer T are insulated from each other.

As explained above, according to the present embodiment, the transformer T is provided, thereby making it possible to insulate the primary side and the secondary side of the power factor improving converter from each other, and even if the power factor improving converter is configured by the insulating converter, the output voltage is controlled based on the average on-duty, thereby making it possible to reduce the boost ratio and largely improve efficiency, similar to the sixth embodiment.

[Twelfth Embodiment]

A power factor improving converter according to a twelfth embodiment is one that obtains an average switching current as a parameter and controls a target level of the switching current according to the obtained average switching current.

Figure 31:
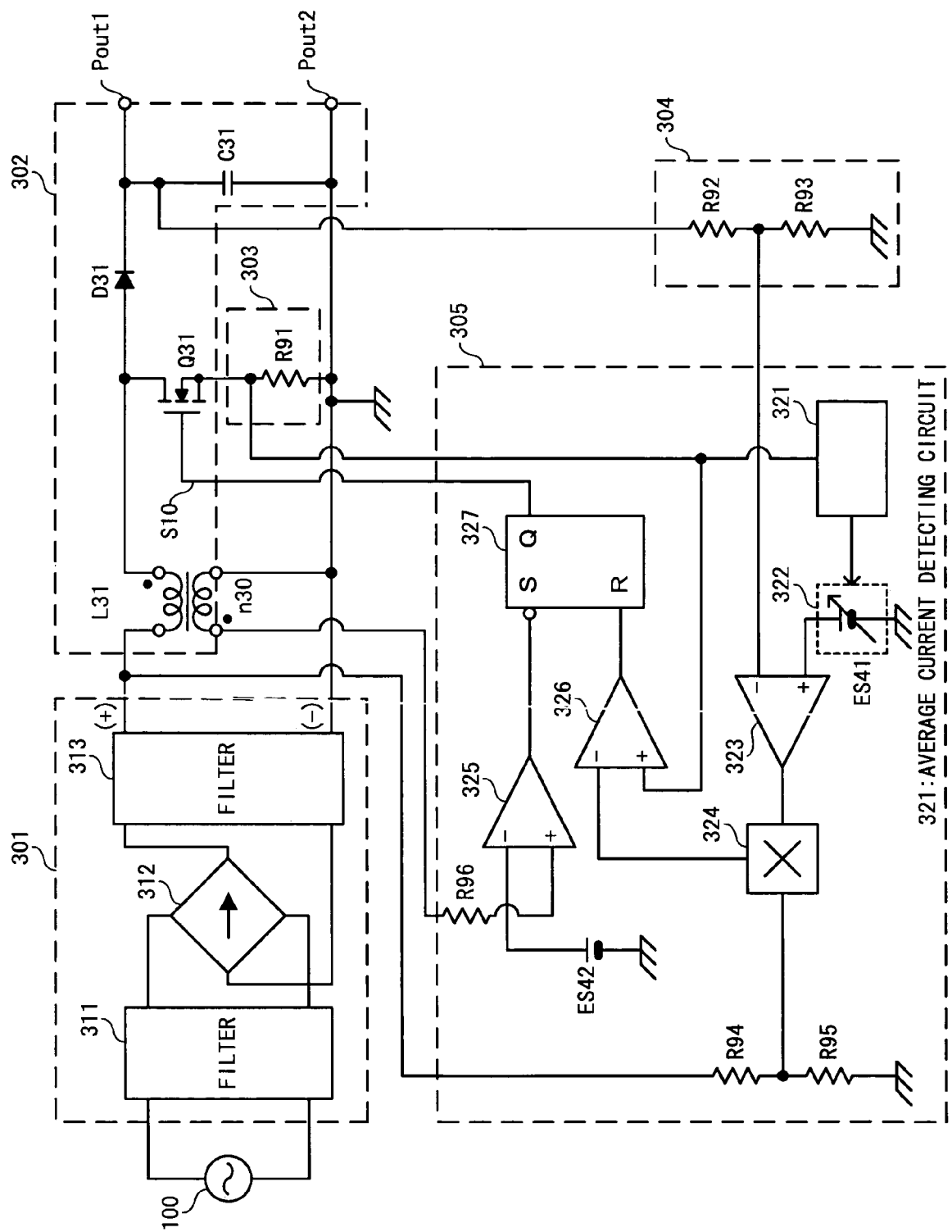
FIG. 31 is a circuit diagram illustrating a configuration of a power factor improving converter according to a twelfth embodiment of the present invention.

A configuration of the power factor improving converter according to the twelfth embodiment is illustrated in FIG. 31.

The power factor improving converter according to the twelfth embodiment includes a rectifying section 301, a voltage converting section 302, a switching current detecting section 303, an output voltage detecting section 304, and a control section 305.

The rectifying section 301 is one that full-wave rectifies AC power supplied from the AC power source 100 to generate a ripple voltage, similar to the rectifying section 201 illustrated in FIG. 12. The rectifying section 301 includes a filter 311, a bridge rectifying circuit 312 and a filter 313.

The voltage converting section 302 is one that converts a ripple rectifying voltage generated by the rectifying section 301 to a DC output voltage, similar to the voltage converting section 202 illustrated in FIG. 12. The voltage converting section 302 includes an inductor L31, a transistor Q31, a diode D31, a capacitor C31.

The switching current detecting section 303 is one that detects a switching (drain) current flowing into the transistor Q31, similar to the switching current detecting section 203 shown in FIG. 12. The switching current detecting section 303 includes a resistor R91. The resistor R91 is one that converts the switching (drain) current to a voltage signal, and is connected between a source of the transistor Q31 and the ground. The switching current detecting section 303 outputs the converted voltage signal to the reference voltage generating circuit 322 of the control section 305 through the average current detecting circuit 321.

The output voltage detecting section 304 is one that detects an output voltage Vout and outputs the voltage detection signal, similar to the output voltage detecting section 204 shown in FIG. 12, and includes resistors R92 and R93.

One end of the resistor R92 is connected to one end of the capacitor C31, one end of the resistor R93 is connected to the other end of the resistor R92, and the other end of the resistor R93 is grounded.

The control section 305 is one that supplies a pulse signal as a gate signal to a gate of the transistor Q31 to perform on/off control of the transistor Q31, similar to the control section 205 shown in FIG. 12. The control section 305 includes an average current detecting circuit 321, a reference voltage generating circuit 322, an operational amplifier 323, a multiplier 324, comparators 325, 326, a flip-flop 327, and resistors R94 to R96.

The average current detecting circuit 321 is one that averages the signal levels of the signal output from the switching current detecting section 303 to detect an average switching current. The average switching current indicates a current level of a supply current that is supplied to the inductor L31 from the AC power source 100 for one cycle of the ripple voltage. A ratio between the effective value of the ripple voltage and the voltage value of the output voltage changes, so that the average switching current changes. In other words, the average switching current results in a parameter indicating the ratio between the effective value of the ripple voltage and the voltage value of the output voltage. The average current detecting circuit 321 has the same configuration as that of the pulse width detecting circuit 221 shown in FIG. 14, and outputs the current detection signal of the average switching current to the reference voltage generating circuit 322.

The reference voltage generating circuit 322, the operational amplifier 323, the multiplier 324, the comparators 325, 326, the flip-flop 327 and the resistors R94 to R96 are the same as the reference voltage generating circuit 222, the operational amplifier 223, the multiplier 224, the comparators 225, 226, the flip-flop 227 and the resistors R44 to R46 shown in FIG. 12, respectively.

An explanation will be next given of the operation of the power factor improving converter according to the twelfth embodiment.

When it is assumed that the voltage level of the rectifying voltage changes from vin1 to vin2 (vin1>vin2), the average switching current increases.

When the average switching current increases, the signal level of the current detection signal becomes high. When the signal level of the current detection signal becomes high, a reference voltage ES41 decreases.

When the reference voltage ES41 decreases, a signal level of an error signal output by the operational amplifier 323 slightly deceases and a target level of the switching current slightly reduces. For this reason, timing with which the flip-flop 327 is reset accelerates slightly, the switching current becomes small slightly and the output voltage Vout reduces. When the output voltage Vout reduces, the boost ratio becomes small and boost energy decreases.

As explained above, according to the present embodiment, when the input/output condition changes to such a condition that requires boost energy, this change is detected by detecting the average switching current to change the output voltage Vout. Accordingly, since the boost ratio decreases and the boost energy also deceases, the switching loss can be reduced and efficiency can be largely improved.

[Thirteenth Embodiment]

A power factor improving converter according to a thirteenth embodiment is one that is configured to switch a division ratio due to the resistors of the output voltage detecting section to control the output voltage.

Figure 32:
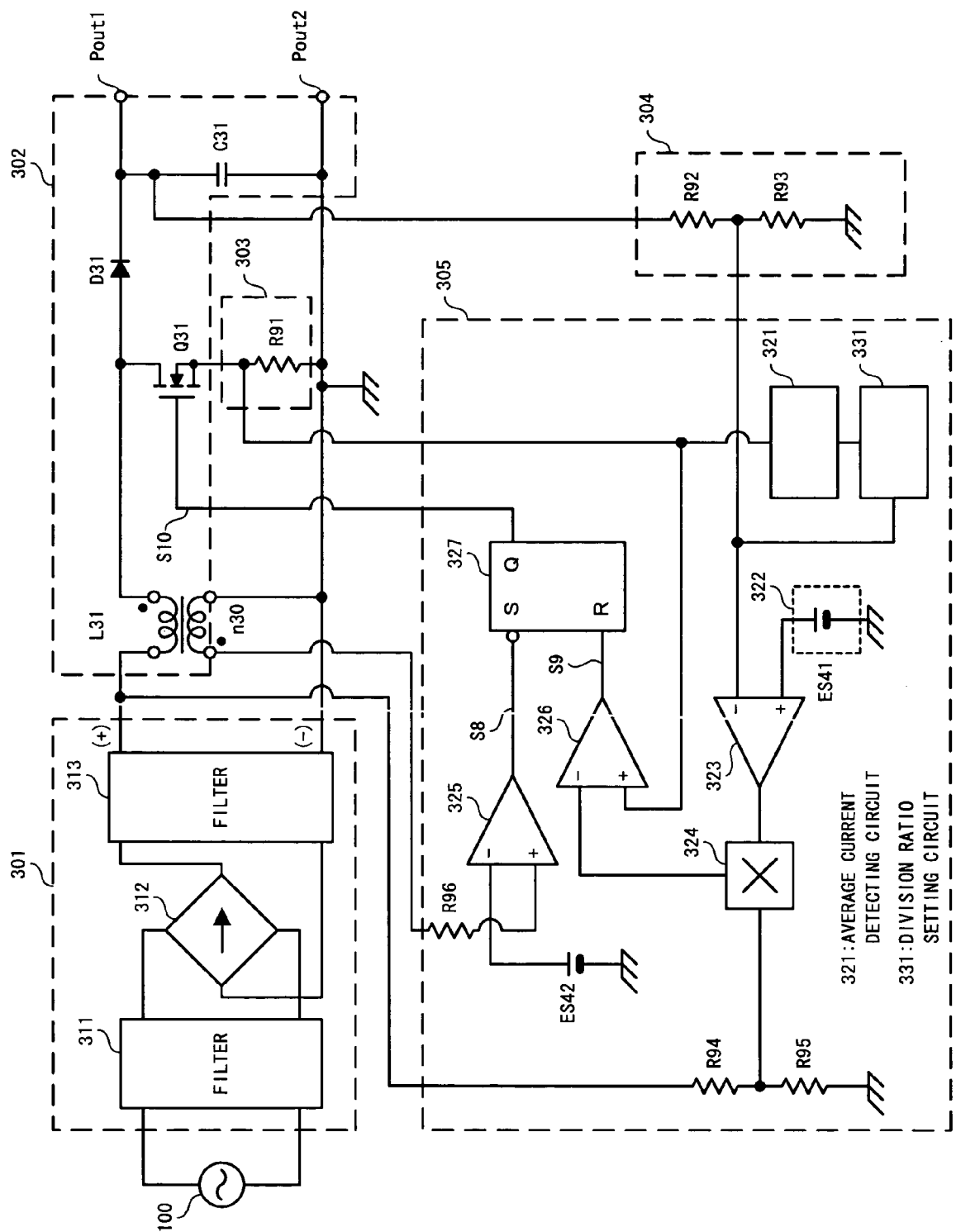
FIG. 32 is a circuit diagram illustrating a configuration of a power factor improving converter according to a thirteenth embodiment of the present invention.

The configuration is illustrated in FIG. 32.

Since the division ratio due to the resistors R92 and R93 of the output voltage detecting section 304 is switched, a division ratio setting circuit 331 is connected between the average current detecting circuit 321 and the output voltage detecting section 304. Additionally, herein, it is assumed that a reference voltage ES41 is a fixed voltage.

Figure 33:
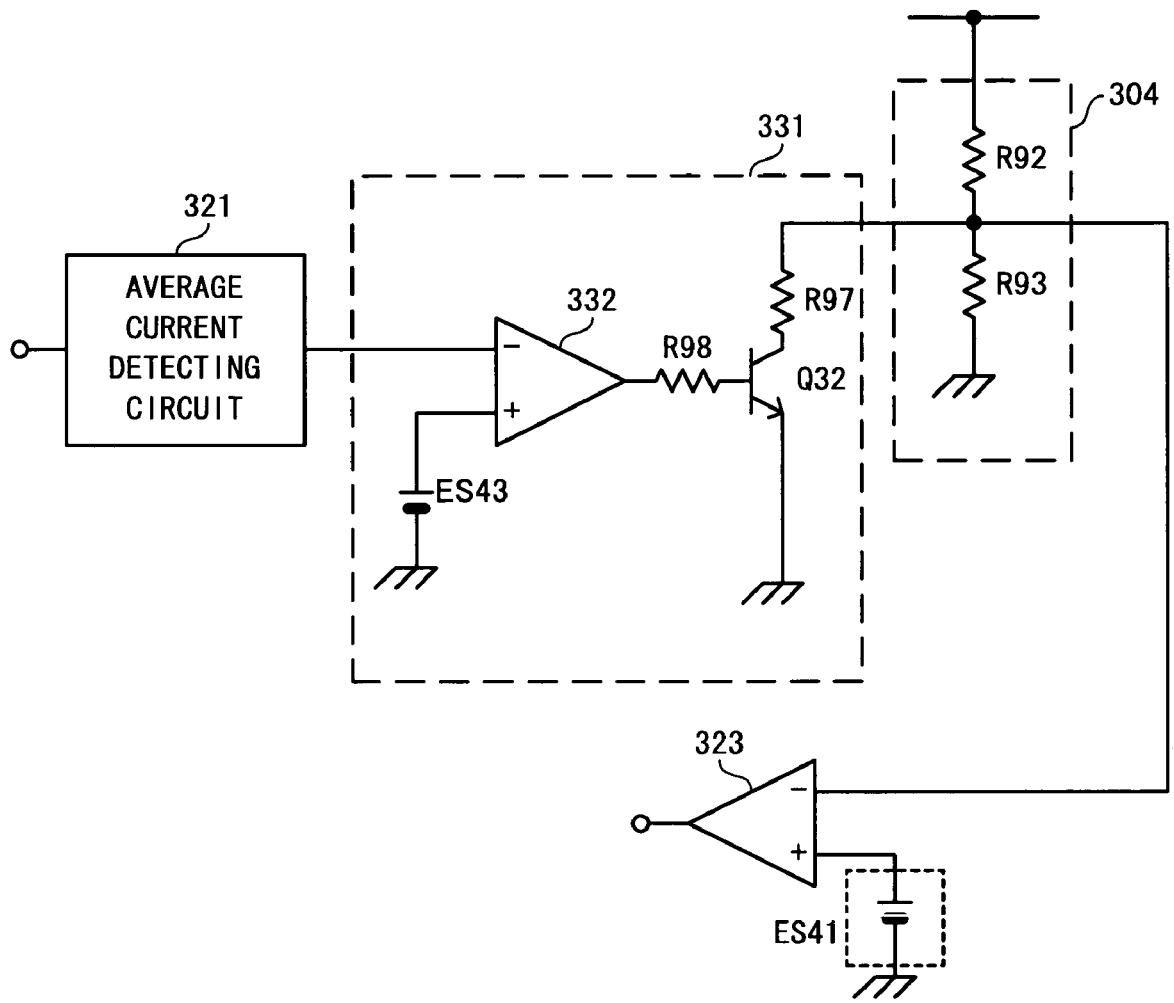
FIG. 33 is a circuit diagram illustrating a configuration of a division ratio setting circuit that the power factor improving converter of FIG. 32 includes.

The division ratio setting circuit 331 includes a comparator 332, resistors R97 and R98 and a transistor Q32 as illustrated in FIG. 33. A fixed reference voltage ES43 is applied to a +terminal of the comparator 332.

According to such the configuration, the signal level of the current detection signal from the average current detecting circuit 321 becomes high as the switching current increases. When the signal level of the current detection signal is higher than the reference voltage ES43, an output level of the comparator 332 becomes an "L" (Low) level and the transistor Q32 turns off. When the transistor Q32 turns off, the division ratio is decided by the resistors R92 and R93.

On the other hand, when the switching current becomes small and the signal level of the current detection signal is lower than the reference voltage ES43, the output level of the comparator 332 becomes an "H" (High) level and the transistor Q32 turns on. When the transistor Q32 turns on, the resistor R93 and the resistor R97 are connected in parallel and the division ratio is decided by the resistor R92 and the parallel-connected resistors R93 and R97. The division ratio increases as compared with the case when the transistor Q32 turns off and the output voltage Vout becomes higher.

As explained above, according to the present embodiment, the division ratio due to the resistors R92 and R93 of the output voltage detecting section 304 is changed, thereby making it possible to control the output voltage Vout.

[Fourteenth Embodiment]

A power factor improving converter according to a fourteenth embodiment is one in which an average current detecting circuit is provided in the rectifying section.

Figure 34:
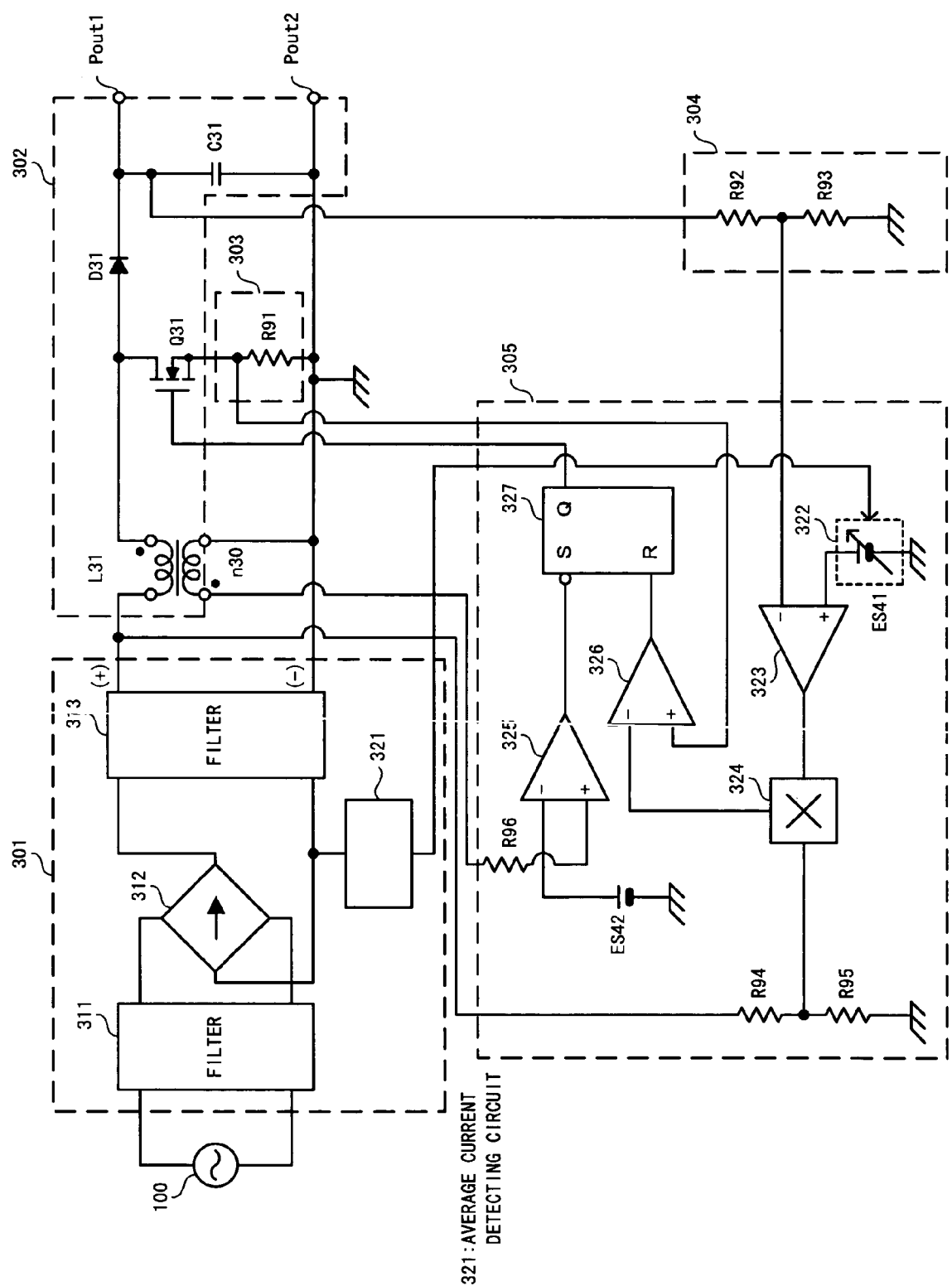
FIG. 34 is a circuit diagram illustrating a configuration of a power factor improving converter according to a fourteenth embodiment of the present invention.

A configuration of the power factor improving converter according to the fourteenth embodiment is illustrated in FIG. 34.

The power factor improving converter according to the fourteenth embodiment is configured by connecting the average current detecting circuit 321 between the bridge rectifying circuit 312 of the rectifying circuit 301 and the filter 313. Then, the average current detecting circuit 321 detects an average voltage of the current output from the fridge rectifying circuit 312 and controls the voltage level of the reference voltage ES41 generated by the reference voltage generating circuit 322 based on the detected average current.

In addition, the average current detecting circuit 321 can be connected to the AC power source 100 side rather than the bridge rectifying circuit 312. In this case, a rectifying diode and a smoothing capacitor (not shown) are provided in the average current detecting circuit 321.

In this way, the average current of the rectifying voltage is detected, and this also makes it possible to detect the average switching current.

Additionally, when the present invention is not limited to the aforementioned embodiments and various modifications can be considered when being carried out.

For example, in the power factor improving converter according to the first to fifth embodiments, the effective value of the boost quantity is detected. However, it is possible to detect an average value of the boost quantity and a peak value in place of the effective value of the boost quantity.

In the power factor improving converter according to the sixth to eleventh embodiments, the pulse width detecting circuit 221 is configured to output the duty detection signal corresponding to the average on-duty. However, the duty detection signal corresponding to the maximum on-duty or minimum on-duty may be output without limiting to this.

In this case, a computer and a memory are provided in the control section 205, on-duty is sampled and comparison between data stored in the memory is performed for each sampling, thereby obtaining the maximum on-duty or minimum on-duty.

Moreover, the output voltage Vout may be controlled based on an average off-duty, a maximum off-duty and a minimum off-duty. In this case, a signal level of a signal output from a Q bar terminal of the flip-flop 227 is integrated by an integrator to obtain an average value.

Furthermore, duty may be sampled by a predetermined phase in synchronization with a ripple rectifying voltage output by the bridge rectifying circuit 312.

Moreover, in the power factor improving converter according to the twelfth embodiment, the following configuration may be possible. First of all, as a current level of the supply voltage supplied to the inductor L31 for one cycle of the ripple voltage, such a configuration that a current level of current flowing into the capacitor C31 from the diode D31 is detected may be possible. In this case, a voltage detector that detects the voltage may be provided between the cathode of the diode D31 and the anode.

Furthermore, similar to the power factor improving converter according to the seventh embodiment, the output voltage may be configured to be controlled in a plurality of stages based on the average switching current. Moreover, similar to the power factor improving converter according to the eighth embodiment, the output voltage may be configured to have an upper limit value or may be configured to have a lower limit value. Furthermore, similar to the power factor improving converter according to the ninth embodiment, the timer may be provided. Moreover, similar to the power factor improving converter according to the tenth embodiment, the output voltage may be configured to be controlled based on the average switching current and the output power. Furthermore, similar to the power factor improving converter according to the eleventh embodiment, a transformer is provided in the voltage converting section, so that the power factor improving converter may be used as an insulating type converter.

Furthermore, in the power factor improving converter according to the sixth and twelfth embodiments, the overvoltage protecting section as illustrated in FIG. 1 may be provided.

Moreover, the power factor improving converter may be a buck type converter instead of the boost type.

The reference voltage generating circuit may be one in which the output voltage Vout complies with a predetermined function and a reference voltage that changes according to the parameter is generated.

Figure 35:
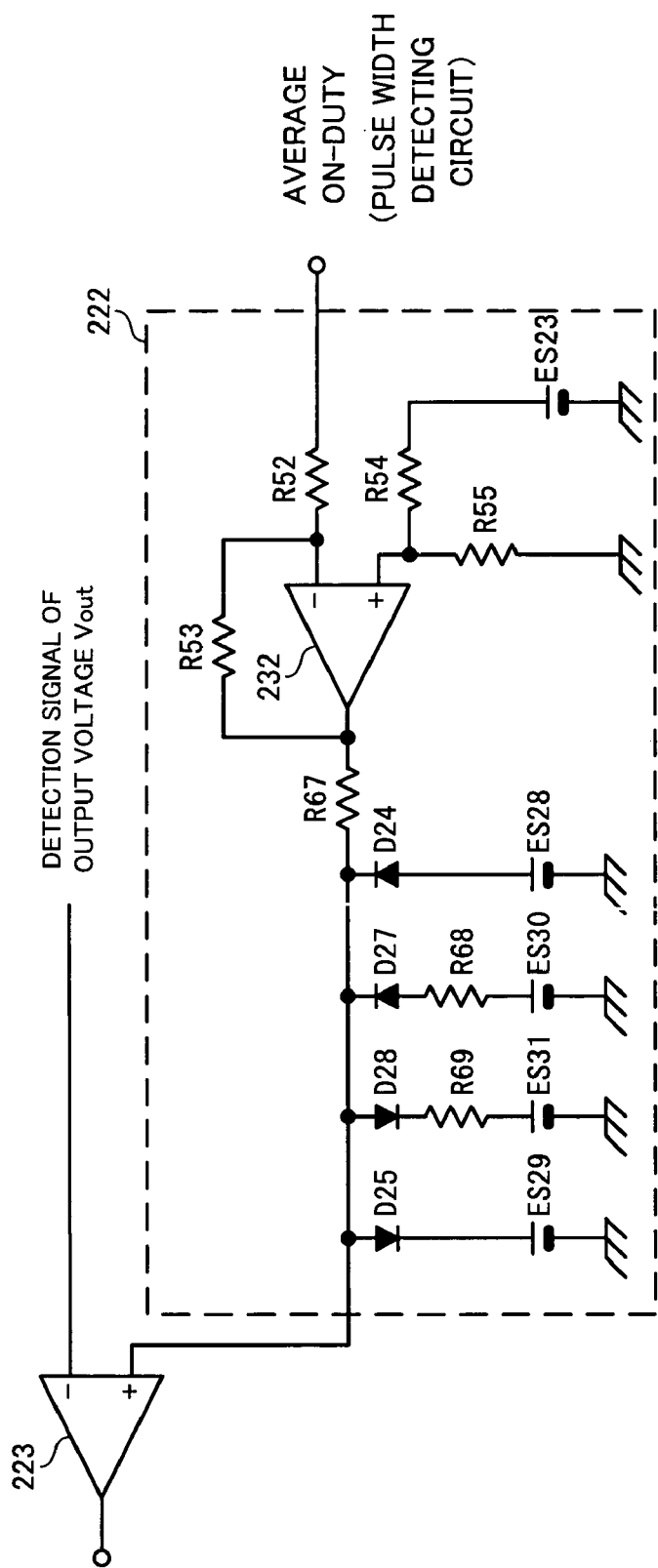
FIG. 35 is a circuit diagram illustrating another configuration of a control section of the power factor improving converter according to the sixth embodiment of the present invention.

For example, as illustrated in FIG. 35, diodes D27, D28 and resistors R68, R69 are further provided in the reference voltage generating circuit 222 illustrated in FIG. 21. A cathode of the diode D27 is connected to a +terminal of the operational amplifier 223. One end of the resistor R68 is connected to an anode of the diode D27. Power of a reference voltage ES30 is supplied to the other end of the resistor R68.

Moreover, an anode of the diode D28 is connected to the +terminal of the operational amplifier 223. One end of the resistor R69 is connected to a cathode of the diode D28. The other end of the resistor R69 is connected to a power source of a reference voltage ES31.

Figure 36:
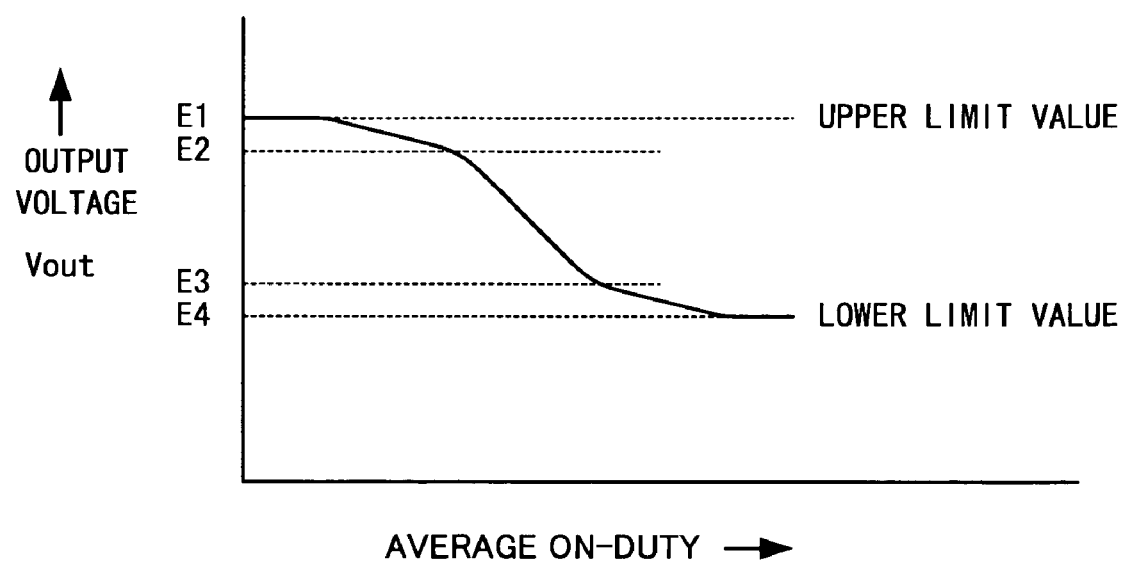
FIG. 36 is an explanatory view illustrating an operation of the power factor improving converter that the control section of the configuration shown in FIG. 35.

When the reference voltage generating circuit 222 is configured in this way, the power factor improving converter has a characteristic as illustrated in FIG. 36.

Additionally, in FIG. 36, E1 to E4 are indicated as the output voltage Vout, and reference voltages ES 28 to ES31 correspond to E1 to E4, respectively. Furthermore, the reference voltages ES28 to ES31 are set in such a way that the output voltage Vout is E4<E3<E2<E1.

When the configuration is made in this way, as the average on-duty increases, the output voltage Vout decreases from an upper limit value E1 and reaches a lower limit value E4 through voltages E2 and E3. In other words, the reference voltages ES28 to ES31 and resistance values of the resistors R68, R69 are adjusted, thereby the output voltage Vout changes based on the value of the parameter according to a predetermined curve.

This application is based on Japanese Patent Application 2002-001403 filed on Jan. 8, 2002 and Japanese Patent Application 2002-16137 filed on Jan. 24, 2002 and Japanese Patent Application 2002-105221 filed on Apr. 8, 2002, and specification, claims, and drawings of the above Japanese Patent Applications are incorporated herein by reference in its entirety.

INDUSTRIAL APPLICABILITY

The present invention is applicable to an industrial field using a power factor improving converter.

What is claimed is:

1. A power factor improving converter comprising:
an inductor (L11, L21, L31) to which a ripple voltage is applied;
a switching element (Q11, Q21, Q31) connected to one end of said inductor (L11, L21, L31) to switch current flowing into said inductor (L11, L21, L31) according to the ripple voltage;
a DC voltage generating section (D16, C11, D21, C21, D31, C31) that rectifies voltage generated across said inductor (L11, L21, L31) by switching said switching element (Q11, Q21, Q31) and smoothes to generate a DC voltage; and
a control section (106, 205, 305) that sets a target level of a switching current flowing into a current path of said switching element based on a voltage level of the ripple voltage and controls to turn on and off said switching element (Q11, Q21, Q31) in such a way that the switching current reaches the target level,
wherein said control section (106, 205, 305) obtains a parameter, which changes when a ratio between an effective value of the ripple voltage and a voltage value of the DC voltage generated by said DC voltage generating section (D16, C11, D21, C21, D31, C31) changes, and controls the target level of the switching current according to a value of the obtained parameter.

2. The power factor improving converter according to claim 1, further comprising a boost quantity detecting section (103) having a secondary winding (n10) electromagnetically coupled to said inductor (L11) to detect a boost quantity of said inductor (L11) generated across the secondary winding (n10),
wherein said control section (106, 205, 305) obtains the boost quantity detected as the parameter by said boost quantity detecting section (103).

3. The power factor improving converter according to claim 2, wherein said boost quantity detecting section (103) detects the boost quantity from any one of an effective value of a ripple voltage, an average value and a peak value.

4. The power factor improving converter according to claim 1, wherein said control section (205) includes a duty ratio detecting section (221) that detects a duty ratio of a control signal that controls to turn on and off said switching element (Q21) to obtain the duty ratio detected by the duty ratio detecting section (221).

5. The power factor improving converter according to claim 4, wherein the duty ratio detecting section (221) detects on-duty or off-duty of the control signal.

6. The power factor improving converter according to claim 5,
wherein the duty ratio detecting section (221) detects the duty ratio of the control signal for a fixed cycle; and
wherein said control section (205) controls the target level of the switching current based on the duty ratio of the control signal detected by the duty ratio detecting section (221).

7. The power factor improving converter according to claim 6, wherein the duty ratio detecting section (221) detects the duty ratio of the control signal for substantially the same fixed cycle as the cycle of the ripple voltage.

8. The power factor improving converter according to claim 4, wherein said control section (205) includes a power measuring section (237) that measures power to be supplied to a load and obtains power as another parameter measured by the power measuring section (237), and controls the target level of the switching current according to the duty ration of the control signal and power.

9. The power factor improving converter according to claim 1, wherein said control section (305) includes a supply current detecting section 321) that detects a current level of a supply current to be supplied to said inductor (L31) for one cycle of the ripple voltage, and obtains the current level of the supply current detected as the parameter by the supply current detecting section (321).

10. The power factor improving converter according to claim 9, wherein the supply current detecting section (321) detects a current level of a switching current flowing into a current path of said switching element (Q31) as a current level of supply current to be supplied to said inductor (L31) for one cycle of the ripple voltage.

11. The power factor improving converter according to claim 9, wherein the supply current detecting section (321) detects a current level of current flowing into said DC voltage generating section (D31, C31) as a current level of supply current to be supplied to said inductor (L31) for one cycle of the ripple voltage.

12. The power factor improving converter according to claim 9, wherein the supply current detecting section (321) includes an integrator.

13. The power factor improving converter according to claim 9, wherein the supply current detecting section (321) includes any one of an effective value detecting circuit that obtains an effective value of supply current as the current level of the supply current for one cycle of the ripple voltage, an average value detecting circuit that obtains an average value and a peak value detecting circuit that obtains a peak value.

14. The power factor improving converter according to claim 9, wherein said control section (305) includes a power detecting section (237) that detects a power level of DC voltage generated by said DC voltage generating section (D16, C11, D21, C21, D31, C31) and obtains a voltage level as another parameter obtained by dividing by the current of the supply current, and controls the target level of the switching current according to the current level of the supply current and the voltage level.

15. The power factor improving converter according to claim 1, further comprising a boost chopper circuit,
wherein one end of said DC voltage generating section (D16, C11, D21, C21, D3, C31) is connected to a junction between said inductor (L11, L21, L31) and said switching element (Q11, Q21, Q31), the other end of the current path of said switching element (Q11, Q21, Q31) and the other end of said DC voltage generating section (D16, C11, D21, D31, C31) are connected to a negative polarity; and
wherein a rectifying voltage is applied to the other end of said inductor (L11, L21, L31).

16. The power factor improving converter according to claim 1,
wherein said inductor (L21) includes a secondary winding (n22) that is electromagnetically coupled to said inductor (L21) as a primary winding (n21) and a transformer (T) having the DC voltage generating section (D21, C21) is connected across the secondary winding (n22); and
wherein a rectifying voltage is applied to the other end of said inductor (L21).

17. The power factor improving converter according to claim 1, wherein said DC voltage generating section (D16, C11, D21, C21, D31, C31) includes an overvoltage protecting section (105) that supplies such an overvoltage protection signal that reduces the target voltage of the switching current to said control section (106, 205, 305) when the voltage level of the generated DC voltage exceeds a setting level.

18. The power factor improving converter according to claim 1, said control section (106, 205, 305) includes:
an amplifier (113, 223, 323) that compares a signal level of an output voltage signal corresponding to an output voltage with a signal level of a predetermined reference signal to output a difference signal between both signal levels as a signal that controls the target level of the switching current; and
a reference signal generating circuit (121, 222, 322) that compares a value of the parameter with a setting value, and supplies such a reference signal, which reduces the target level of the switching current of the switching element (Q11, Q21, Q31) as a ratio between the effective value of the ripple voltage and the voltage value of the DC voltage generated by said DC voltage generating section (D16, C11, D21, C21, D31, C31) increases based on a comparison result, to the amplifier (113, 223, 323).

19. The power factor improving converter according to claim 18, wherein the reference signal generating circuit (121, 222, 322) has a hysterisis characteristic.

20. The power factor improving converter according to claim 18, wherein said control section (106, 205, 305) includes a timer (236) that delays the output of the reference signal to the amplifier from the reference signal generating circuit (121, 222, 322) by a predetermined time when the value of the obtained parameter exceeds the setting value.

21. The power factor improving converter according to claim 18, wherein the reference signal generating circuit (121, 222, 322) restricts the signal level of the reference signal in such a way to set an upper limit value or a lower limit value corresponding to a DC voltage generated by said DC voltage generating section (D16, C11, D21, C21, D31, C31).

22. The power factor improving converter according to claim 18, wherein when the reference signal is supplied from the reference signal generating circuit (121, 222, 322), the amplifier (113, 223, 323) outputs such a difference signal in which the signal level of the difference signal becomes small according to a predetermined function indicating a relationship between the value of the parameter and a change in the signal level of the difference signal.

23. The power factor improving converter according to claim 22, wherein the predetermined function is a function in which a relationship between time when the value of the obtained parameter exceeds the setting value and the signal level of the difference signal is expressed by a linear function.

24. The power factor improving converter according to claim 1, wherein said control section (106, 205, 305) includes:
an amplifier (113, 223, 323) that compares a signal level of an output voltage signal corresponding to an output voltage with a signal level of a predetermined reference signal to output a difference signal between both signal levels as a signal that controls the target level of the switching current; and
a reference signal generating circuit (121, 222, 322) that has a plurality of setting values to be compared with a value of the parameter, and supplies such a reference signal, which reduces the target level of the switching current of the switching element (Q11, Q21, Q31) sequentially every time when the value of the parameter increases and exceeds each of the respective setting values, to the amplifier (113, 223, 323).

25. The power factor improving converter according to claim 24, wherein the reference signal generating circuit (121, 222, 322) has a hysterisis characteristic.

26. The power factor improving converter according to claim 1, wherein said control section (106, 205, 305) includes:
an amplifier (323) that compares a signal level of an output voltage signal corresponding to an output voltage with a signal level of a predetermined reference signal to output a difference signal between both signal levels as a signal that controls the target level of the switching current; and
an output voltage signal control circuit (331) that reduces a signal level of an output voltage signal to be supplied to the amplifier (323) in such a way to reduce the target level of the switching current of said switching element (Q11, Q21, Q31) when the value of the obtained parameter is compared with the setting value and the value of the obtained parameter exceeds the setting value.

27. A power factor improving converter control method that controls a power factor improving converter including an inductor (L11, L21, L31) to which a ripple voltage is applied;
a switching element (Q11, Q21, Q31) connected to one end of said inductor (L11, L21, L31) to switch current flowing into said inductor (L11, L21, L31) according to the ripple voltage; and
a DC voltage generating section (D16, C11, D21, C21, D31, C31) that rectifies voltage generated across said inductor (L11, L21, L31) by switching said switching element (Q11, Q21, Q31) and smoothes to generate a DC voltage;

said method comprising the steps of:

setting a target level of a switching current flowing into a current path of said switching element based on a voltage level of the ripple voltage;

controlling to turn on and off said switching element (Q11, Q21, Q31) in such a way that the switching current reaches the target level;

obtaining a parameter that changes when a ratio between an effective value of the ripple voltage and a voltage value of the DC voltage generated by said DC voltage generating section (D16, C11, D21, C21, D31, C31) changes; and controlling the target level of the set switching current according to a value of the obtained parameter.

28. The power factor improving converter control method according to claim 27, further comprising the steps of:

detecting a boost quantity of said inductor (L11, L21, L31); and obtaining the detected boost quantity as a parameter.

29. The power factor improving converter control method according to claim 27, further comprising the steps of:

detecting a duty ratio of a control signal that controls to turn on and off said switching element (Q11, Q21, Q31); and obtaining the detected duty ratio as a parameter.

30. The power factor improving converter control method according to claim 27, further comprising the steps of:

detecting a current level of current flowing into said inductor (L11, L21, L31) according to the ripple voltage; and obtaining the current level of the detected supply current as the parameter.

* * * * *